(12) United States Patent
Yoshida et al.

(10) Patent No.: US 8,384,238 B2
(45) Date of Patent: Feb. 26, 2013

(54) WIRING METHOD AND WIRING SYSTEM FOR STRUCTURES

(75) Inventors: Ichirou Yoshida, Takahama (JP); Kimiaki Tanaka, Nagoya (JP)

(73) Assignee: DENSO CORPORATION, Kariya (JP)

( * ) Notice: Subject to any disclaimer, the term of this patent is extended or adjusted under 35 U.S.C. 154(b) by 350 days.

(21) Appl. No.: 12/849,933

(22) Filed: Aug. 4, 2010

(65) Prior Publication Data

US 2011/0031809 A1    Feb. 10, 2011

(30) Foreign Application Priority Data

Aug. 5, 2009 (JP) ................................ 2009-182779
Mar. 23, 2010 (JP) ................................ 2010-066903

(51) Int. Cl.
     *B60L 1/00* (2006.01)
(52) U.S. Cl. ........................................................ 307/9.1
(58) Field of Classification Search ................... 307/9.1
See application file for complete search history.

(56) References Cited

U.S. PATENT DOCUMENTS

2002/0180271 A1    12/2002    Taniguchi et al.

FOREIGN PATENT DOCUMENTS

| JP | U-58-163334 | 10/1983 |
| JP | U-2-033516 | 3/1990 |
| JP | H05-058230 A | 3/1993 |
| JP | A-11-027822 | 1/1999 |
| JP | A-2000-354052 | 12/2000 |
| JP | A-2004-056167 | 2/2004 |
| JP | 2004-306811 A | 11/2004 |
| JP | A-2004-314670 | 11/2004 |
| JP | 2005-324712 A | 11/2005 |
| JP | 2007-28411 A | 2/2007 |
| JP | A-2008-284943 | 11/2008 |

OTHER PUBLICATIONS

Office Action mailed Aug. 23, 2011 in corresponding JP application No. 2010-066903 (and English translation).

*Primary Examiner* — Robert L. Deberadinis
(74) *Attorney, Agent, or Firm* — Posz Law Group, PLC

(57) ABSTRACT

A unitized wiring portion (wiring unit) has a hard pipe member, a wire provided in the pipe member, and outside wiring connectors connected at each end of the wire. A plurality of wiring units are prepared in advance, wherein wiring units are divided into multiple groups having different length of wires and so on. The wiring units are arranged in a structure (e.g. a vehicle body) and the outside wiring connectors are connected to each other to form a wiring network. The wiring units are fixed to frame and/or reinforcing members to thereby increase mechanical strength of the structure.

13 Claims, 23 Drawing Sheets

WIRING METHOD AND WIRING SYSTEM FOR STRUCTURES

CROSS REFERENCE TO RELATED APPLICATION

This application is based on Japanese Patent Application No. 2009-182779 filed on Aug. 5, 2009 and Japanese Patent Application No. 2010-066903 filed on Mar. 23, 2010, the disclosures of which are incorporated herein by reference.

FIELD OF THE INVENTION

The present invention relates to a wiring method and a wiring system for a structure, such as an automotive vehicle, an aircraft and a building and so on, for which higher strength is required. In particular, the present invention relates to a wiring method and a wiring system preferably applied to a retrofitting in-vehicle component, such as a monitoring camera, which will be mounted in a vehicle in an aftermarket.

BACKGROUND OF THE INVENTION

A wiring method or a wiring system is generally known in the art, for example, as disclosed in Japanese Patent Publication No. H05-058230, according to which a vehicle body is divided into multiple blocks, multiple electrical components are assembled to form a module for the respective blocks, and such multiple modules are electrically connected via a multiplex transmission network, so that a wiring network for the vehicle is established.

According to the above wiring method or the wiring system, the wiring network has control nodes for controlling communication among the electrical components provided in the respective modules, wire harnesses for forming transmission lines between the respective control nodes, and connectors for connecting the control nodes and the wire harnesses with each other.

The multiplex transmission network is applied to the entire vehicle body. In each of the modules (the multiple blocks) for forming the vehicle body, a block control node is provided for controlling communication among the electrical components in the respective modules so that the communication is independently carried out in the respective modules. As a result, communication can be carried out between the respective modules by means of a small number of wires, which include a communication line being composed of a twisted wire.

In addition, as a result that small and simple connectors are provided between the respective modules it becomes possible to combine the respective modules after each of the modules is independently assembled, to thereby realize a production of the vehicle body by modularizing the respective vehicle blocks.

Furthermore, the vehicle body is constructed by combining reinforcing members and frame members, wherein the reinforcing members and the frame members form a framed structure. The above mentioned prior art discloses a structure in which wires are provided along the reinforcing members and/or the frame members of the vehicle body, and a structure in which the wires are embedded in the reinforcing members and/or the frame members of the vehicle body.

According to the above mentioned prior art, a wiring structure may be simplified. However, the above mentioned prior art does disclose neither a method for increasing strength of a structure, nor standardization or simplification of wiring work.

In addition, the above mentioned prior art does not disclose, either, user-friendliness for the wiring work, which will be done for the in-vehicle components mounted in a vehicle afterwards in the aftermarket, namely after the structure for the vehicle body has been completed.

SUMMARY OF THE INVENTION

The present invention is made in view of the above problems. It is an object of the present invention to provide a wiring method and/or a wiring system for a structure, according to which it is possible to increase strength of frame members and/or reinforcing members by means of the wiring work, and according to which higher efficiency and/or standardization for the wiring work can be achieved.

It is sometimes necessary to add other wires to a wiring network or to mount another electrical device in the wiring network, after the wiring network has been established. It is desired, in such a case, that a control unit provided in the wiring network correctly grasps situation of the wiring network and takes measures to meet the situation.

According to a feature of the present invention (for example, as defined in the claim 1 originally filed) a wiring method for a structure, which is composed of multiple frame and/or reinforcing members and in which multiple wires are provided along with or embedded in the frame and/or reinforcing members, has a first step of preparing multiple wiring units, each having a hard pipe member, a wire provided in the pipe member, outside wiring connectors provided at outside of the pipe member and connected to each end of the wire, wherein the pipe member, the wire and the outside wiring connectors are unitized as the wiring unit. The wiring method has a second step of preparing multiple different groups of the wiring units, wherein each group of the wiring unit has the multiple wiring units, and length and/or diameter of the pipe member is different from group to group. And the wiring method has a third step of arranging the different groups of the wiring units to the respective frame and/or reinforcing members and electrically connecting neighboring outside wiring connectors of the wiring units with each other to form a wiring network for the structure, an electronic control unit and an electrical device being connected to the wiring network. The wiring method has a fourth step of fixing each of the wiring units to the respective frame and/or reinforcing members so as to increase mechanical strength of the structure.

According to the above feature, it is possible to increase mechanical strength the frame members and/or reinforcing members by the pipe members of the wiring units. The wiring units are in advance unitized, wherein the wiring units have multiple different groups. The multiple wiring units of the different groups are provided in the structure, for example, in the vehicle body, and wiring connectors of the respective wiring units are connected to each other. As a result, it is possible to increase efficiency of wiring operation.

According to another feature of the invention (for example, as defined in the claim 2 originally filed), in the above wiring method, each of the wiring units has bushing members attached to each end of the pipe member, the wire has a margin portion accommodated in the pipe member, and each end of the wire outwardly extends from the pipe member through each of the bushing members and connected to the respective outside wiring connectors of the other neighboring wiring units.

According to the above feature, it is possible to connect the wiring units with each other via the wiring connectors, even when there are variations of distances between the wiring units.

According to a further feature of the invention (for example, as defined in the claim 3 originally filed), in the above wiring method, the wiring unit has an inside wiring connector provided in the pipe member and connected to the wire, each of the outside and inside wiring connectors has a pair of connector parts which are coupled to each other and can be de-coupled from each other according to need, and an opening is formed at a side portion of the pipe member and a side bushing member is detachably provided at the opening.

And the wiring method further has a step of bringing out the inside wiring connector from the pipe member; a step of de-coupling the inside wiring connector so that each of the connector parts are separated from each other; and a step of electrically connecting each of the de-coupled connector parts to the electrical device.

According to the above feature, the wire is separably arranged in the pipe member by means of the inside wiring connector having the detachable connector parts provided in the pipe member, the opening is formed at the side portion of the pipe member, and the side bushing member is attached to the opening. Therefore, the electrical device can be easily connected to the inside wiring connector when the inside wiring connector is brought out from the pipe member through the opening.

According to a still further feature of the invention (for example, as defined in the claim 4 originally filed), in the above wiring method, the wiring unit is connected to multiple routers from which multiple communication lines are branched off, and/or to a wiring module connected to the electrical device. The communication line is supplied with electrical power from a power supply line formed by the wire provided in the wiring network, via the routers (3, 4) and/or the electrical module, and the electrical device is controlled by the electronic control unit by means of multiplex communication via the communication line.

According to the above feature, it is possible to simplify the wiring condition in the wiring unit, and therefore it becomes easier to accommodate the wiring unit in the frame member or the reinforcing member.

According to a still further feature of the invention (for example, as defined in the claim 5 originally filed), in the above wiring method, the structure is a vehicle body, and the electrical device is a retrofitting in-vehicle device, which is mounted in the vehicle afterwards depending on a request of a vehicle user.

According to the above feature, it is possible to easily mount the retrofitting device (for example, the sensor or the light, such as the camera as the visual sensor for, monitoring the circumference) in the vehicle, such as the airplanes automobiles, trains and so on. It is desirable that the frame members and/or reinforcing members of the vehicle have higher mechanical strength, in view of unanticipated situation (such as accidents). According to the feature of the invention, since the wiring units increase the mechanical strength of the frame members and/or the reinforcing members of the vehicle, it is possible to provide the vehicle withstanding the damages in the accident.

According to a still further feature of the invention (for example, as defined in the claim 6 originally filed), in the above wiring method, the electronic control unit automatically figures out a wiring topology indicating a connecting pattern of the wiring connectors and the electrical device, after the wiring network has been completed, wherein the wiring connectors and the electrical device are connected to the electronic control unit.

According to the above feature, since the wiring topology is automatically decided by the electronic control unit after the electrical device is connected to the wiring network, it is possible to decrease labor hour for inputting necessary information into the electronic control unit and thereby to decrease input errors.

According to a still further feature of the invention (for example, as defined in the claim 7 originally filed), in the above wiring method, each of the wiring connectors has an ID information portion for storing therein ID information of the wiring connector and a communication control portion for controlling communication to a downstream side thereof. And the electronic control unit figures out the wiring topology by performing the following steps of: a first step of outputting a command signal to all of the wiring connectors to send back ID information thereof and reading the ID information sent back from the wiring connectors; a second step of selecting one of the wiring connectors which has sent back its ID information to the electronic control unit; a third step of outputting a command signal to such selected wiring connector to stop communication to wiring connectors located at a downstream side of the selected wiring connector; a fourth step of outputting a command signal to all of the wiring connectors to send back ID information thereof under the condition that the selected wiring connector stops the communication to the downstream side wiring connectors, and reading the ID information sent back from the wiring connectors; a fifth step of determining a number of reply for the ID information sent back from the wiring connectors; a sixth step of repeating the above second to fifth steps; and a seventh step of deciding the wiring topology of a tree structure based on number of reply for the respective wiring connectors determined by the above second to sixth steps.

According to the above feature, it is possible to correctly collect the ID information of the wiring connectors by means of the communication control portions of the respective wiring connectors, and to decide the wiring topology of the wiring network wherein the wiring connectors are arbitrarily connected to each other.

According to a still further feature of the invention (for example, as defined in the claim 8 originally filed), in the above wiring method, the wiring network has link-up connectors provided in loop wires, and the electronic control unit makes the link-up connectors in a non-conductive condition and then carries out the steps for collecting the ID information of the wiring connectors provided in the wiring network of the tree structure.

According to the above feature since the wiring network has link-up connectors forming the loop wires, the operation of the wiring network can be maintained by the loop wires even when a portion of the wiring network is damaged. In addition, the electronic control unit starts to collect the ID information of the wiring connectors, after the connection of the link-up connectors are shut down and thereby the loop wires are temporarily removed from the wiring network. Accordingly, the electronic control unit can easily decide the wiring topology.

According to a still further feature of the invention (for example, as defined in the claim 9 originally filed), in the above wiring method, the electronic control unit starts an operation of a program, which is stored in the electronic control unit and specifically designed for the electrical device, based on the wiring topology figured out by the electronic control unit.

According to the above feature, since it is possible to start the specific program stored in the memory based on the wiring topology, it is not necessary to carry out complicated signal processing and to add a program. Therefore, it becomes easier to start the operation of the retrofitting device. For example, in the case that the monitoring camera for monitoring the rear side of the structure is mounted as the retrofitting device, it is possible to start the operation of the program which is suitable for monitoring the rear side of the structure.

According to a still further feature of the invention (for example, as defined in the claim 10 originally filed), a wiring system for a structure has a wiring network provided for the structure and having multiple wiring connectors, wherein each of the wiring connectors has its own ID information, and each of the wiring connectors has a pair of connector parts which are detachably connected to each other so that any electrical parts including wire may be additionally connected to detached connector parts of the wiring connector. The wiring system for the structure further has an electronic control unit provided in the wiring network, wherein the electronic control unit automatically figures out wiring topology indicating a connecting pattern of the wiring connectors and the electrical parts, which are connected to the electronic control unit via the wiring network, based on the ID information of the wiring connectors.

According to the above feature, the electronic control unit automatically decides the wiring topology indicating the connecting pattern of the wiring connectors and the electrical parts based on the ID information of the wiring connectors. Therefore, it is possible to grasp the change of the wiring network and the electrical parts afterwards connected to the wiring network as the retrofitting device. Furthermore, it becomes possible to take necessary measures, for example, to change a set-up condition, to change a program, to install a new program, to change a display mode, and so on.

According to a still further feature of the invention (for example, as defined in the claim 11 originally filed) in the wiring system for the structure, a first electrical device is connected to the wiring network to which the electronic control unit is connected, a second electrical device is connected to the wiring network after the first electrical device has been connected to the wiring network, and the electronic control unit automatically, figures out a wiring topology indicating a connecting pattern of the first and second electrical devices and the wiring connectors based on the ID information of the wiring connectors.

According to the above feature, when the second electrical device is connected to the wiring network as the retrofitting device after the first electrical device as we as the electronic control unit has been connected to the wiring network, and then the electronic control unit automatically decides based on the ID information the wiring topology, indicating the connecting pattern of the retrofitting device. Accordingly, when an electrical device is mounted in the vehicle as an optional accessory during an assembling process of the vehicle, wherein the electrical device is mounted as the retrofitting device after the standard equipments have been already mounted, it is possible to automatically decide based on the ID information the wiring topology indicating the connecting pattern of the retrofitting device.

According to a still further feature of the invention (for example, as defined in the claim 12 originally filed), in the wiring system for the structure, the electronic control unit automatically figures out a wiring topology when a first electrical device is connected to the wiring network, and the electronic control unit automatically figures out a renewed wiring topology, when a second electrical device is connected to the wiring network after the electronic control unit has figured out the wiring topology including the first electrical device.

According to the above feature, even in the case that the second electrical device is mounted in the vehicle as the retrofitting device after the electronic control unit has operated to decide the wiring topology for the wiring network including the first electrical device, the wiring topology for the retrofitting device is automatically decided by the electronic control unit. Accordingly, even when the second electrical device is mounted in the vehicle as the optional accessory (as the retrofitting device) during the assembling process of the vehicle, after the standard equipments have been already mounted, it is possible to correctly decide the wiring topology for the retrofitting device.

According to a still further feature of the invention (for example, as defined in the claim 13 originally filed), in the wiring system for the structure, each of the wiring connectors has an ID information portion for storing therein ID information of the wiring connector and a communication control portion for controlling communication to a downstream side thereof.

And the electronic control unit figures out the wiring topology by performing the following steps: a first step of outputting a command signal to all of the wiring connectors to send back ID information thereof and reading the ID information sent back from the wiring connectors; a second step of selecting one of the wiring connectors which has sent back its ID information to the electronic control unit; a third step of outputting a command signal to such selected wiring connector to stop communication to wiring connectors located at a downstream side of the selected wiring connector; a fourth step of outputting a command signal to all of the wiring connectors to send back ID information thereof under the condition that the selected wiring connector stops the communication to the downstream side wiring connectors and reading the ID information sent back from the wiring connectors; a fifth step of determining a number of reply for the ID information sent back from the wiring connectors; a sixth step of repeating the above second to fifth steps; and a seventh step of deciding the wiring topology of a tree structure based on number of reply for the respective wiring connectors determined by the above second to sixth steps.

According to the above feature, it is possible to correctly collect the ID information of the wiring connectors by means of the communication control portions of the respective wiring connectors, and to decide the wiring topology of the wiring network wherein the wiring connectors are arbitrarily connected to each other.

According to a still further feature of the invention (for example, as defined in the claim 14 originally filed), in the above wiring system, the wiring network has link-up connectors provided in loop wires, and the electronic control unit makes the link-up connectors in a non-conductive condition and then carries out the steps for collecting the ID information of the wiring connectors provided in the wiring network of the tree structure.

According to the above feature, since the wiring network has link-up connectors forming the loop wires, the operation of the wiring network can be maintained by the loop wires even when a portion of the wiring network is damaged. In addition, the electronic control unit starts to collect the ID information of the wiring connectors, after the connection of the link-up connectors are shut down and thereby the loop wires are temporarily removed from the wiring network. Accordingly, the electronic control unit can easily decide the wiring topology.

According to a still further feature of the invention (for example, as defined in the claim 15 originally filed), in the above wiring system, the electronic control unit in advance stores in its memory information relating to ID information of the link-up connectors and locations of the link-up connectors in the wiring network, and the electronic control unit determines locations of the wiring connectors based on the locations of the link-up connectors.

According to the above feature, the electronic control unit determines the locations of the wiring connectors based on the locations of the link-up connectors. It is possible to easily determine the locations of the wiring connectors and the locations of the electrical device (the retrofitting device) connected to the wiring connectors.

According to a still further feature of the invention (for example, as defined in the claim 16 originally filed), in the above wiring system, the electronic control unit starts an operation of a program, which is stored in the electronic control unit and specifically designed for the electrical parts based on the wiring topology figured out by the electronic control unit.

According to the above feature, since it is possible to start the specific program stored in the memory based on the wiring topology, it is not necessary to carry out complicated signal processing and to add a program. Therefore, it becomes easier to start the operation of the retrofitting device. For example, in the case that the monitoring camera for monitoring the rear side of the structure is mounted as the retrofitting device, it is possible to start the operation of the program which is suitable for monitoring the rear side of the structure.

According to a still further feature of the invention (for example, as defined in the claim 17 originally filed), in the above wiring system, the wiring network has multiple routers from which multiple communication lines of the wiring network are branched off, and/or a wiring module connected to the electrical parts. In the wiring system, power supply lines and the communication lines, which are formed by the wires provided in the wiring network, are connected to each other by the routers and/or module, and the electrical parts is controlled by the electronic control unit by means of multiplex communication via the communication line.

According to the above feature, even when a large number of wiring connectors are connected to the electronic control unit, the electronic control unit collects the ID information from the respective wiring connectors by means of the multiplex communication.

BRIEF DESCRIPTION OF THE DRAWINGS

The above and other objects, features and advantages of the present invention will become more apparent from the following detailed description made with reference to the accompanying drawings. In the drawings:

FIGS. 16A and 16B are schematic perspective views showing position changes of the camera assembly (the retrofitting device) mounted at a right-hand side of a vehicle ceiling, wherein FIG. 16A shows a position before operation while FIG. 16B shows a position after operation;

DETAILED DESCRIPTION OF THE PREFERRED EMBODIMENTS

First Embodiment

Figure 1:
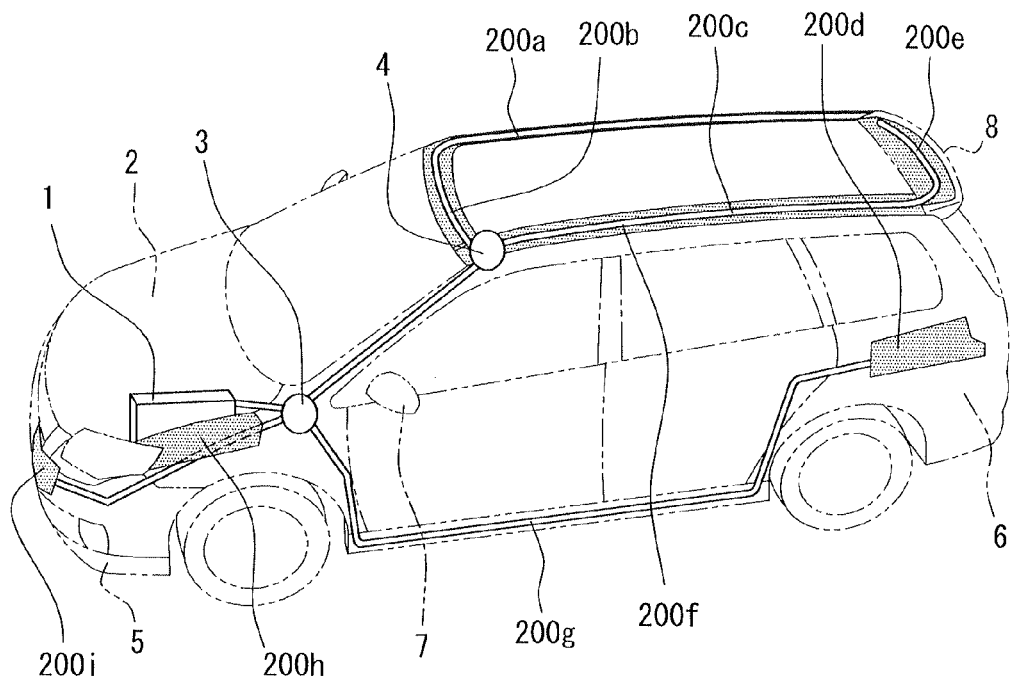
FIG. 1 is a schematic view showing a general outline of a wiring network for an electric vehicle according to a first embodiment of the present invention.

A first embodiment of the present invention will be explained with reference to FIGS. 1 to 17. FIG. 1 is a schematic view showing a general outline of a wiring network for an electric vehicle, in particular a plug-in type hybrid car, to which the present invention is applied.

The vehicle has a battery 1 which is charged with night electric power from an outside of the vehicle (e.g. from a home outlet), so that the vehicle runs as an electric car by an electric motor for a short distance. When the vehicle runs for a long distance, for example, a gasoline engine is automatically started to operate.

In the above vehicle, it is important to simplify and standardize wires in the vehicle. Through the simplification and standardization of the wires, it becomes possible not only to cut down labor cost for wiring work but also to make the work by robots easier.

A user may equip his vehicle with an in-vehicle component (for example, a camera) in an aftermarket so as to increase safety of the vehicle, to meet needs of diversity and so on. Therefore, a wiring structure for a vehicle body is desired, which could provide flexibility for locating such in-vehicle component. For that purpose, such a vehicle body structure is desirable, in which necessary wires for such in-vehicle component are embedded in advance.

According to the vehicle to which the first embodiment of the present invention is applied, a space formed in reinforcing members for the vehicle body is used as a space for laying down the wires. In FIG. 1, the battery 1 for the plug-in type hybrid car is arranged inside of a hood 2, from which electric power lines (not shown) as well as communication lines for multiplex communication are extending.

Routers 3 and 4 are provided at connecting nodes, at which communication lines connecting various kinds of modules provided in various portions of the vehicle with each other are connected. The middle and top routers 3 and 4 are one of in-vehicle components for connecting communication networks with each other.

The middle router 3 is provided at a front side of the vehicle, and the top router 4 is provided at a roof of the vehicle, wherein the routers 3 and 4 are connected with each other by a communication line arranged at a side portion of a front windshield glass. An in-vehicle server (not shown), which is an electronic control unit for the communication lines and the routers 3 and 4, is located at a lower portion of a vehicle cluster.

The in-vehicle server (also referred to as a vehicle server or the electronic control unit) has a wiring topology detecting portion for deciding a wiring topology by collecting information (including ID information) relating to connectors (not shown in FIG. 1 or 2) before starting communication. The vehicle server controls a vehicle network and in-vehicle components mounted afterwards in the vehicle and connected to the vehicle network (also referred to as a retrofitting device).

More exactly, the vehicle server stores wiring information (e.g. where in the vehicle, how, and what kinds of wires are laid down) as a location map for ID information of the connectors. Whenever the wiring condition is changed, the location map for ID information of the connectors is changed to update the stored contents.

The construction of the structure, such as the vehicle, is composed of multiple frame members as well as reinforcing members forming the vehicle body. The reinforcing members include frames provided at a rear side of the hood 2, frame structures provided in various portions of the vehicle body, for example in rear sides of bumpers 5 and 6 for impact absorption.

It is known in the prior art that a camera may be fixed to various portions of the vehicle body, for example, embedded in advance in a side-view mirror 7, fixed to a rear portion of the vehicle body close to a roof 8, or embedded in the bumpers 5 and 6. However, in the above prior art, the conventional camera does not always meet a user's demand for monitoring a specific portion, at which the user wants to take a look.

Therefore, such a product (a camera) is available in the aftermarket, which can be fixed by means of adhesive material, screws, and so on, to any portion at which the user wants to fix the camera. Since the camera can be fixed to any portion, it is possible for the user to monitor (look at) any places where the user wants to see. It is, however, necessary to wire up (connect) the camera with an electric power line and a display device with a signal line for transmitting image data, in order to display camera image on the display device provided in a passenger compartment of the vehicle. It takes a time and it is a troublesome work.

It is further necessary to adequately fix the in-vehicle component (retrofitting device) to the vehicle body. Otherwise, the adhesive material may be exposed, or the wires may be hung out to thereby destroy appearance. In addition, aged deterioration by ultraviolet light may occur in the resin of the adhesive material.

Interior parts as well as exterior parts for the vehicle shown in FIG. 1 are so designed that multiple in-vehicle components (for example, a monitoring camera for monitoring the outside of the vehicle, a telecommunication apparatus for communication with other vehicles, sensors making use of wireless communication) may be fixed to such favorite portions inside and/or outside of the vehicle, at which the user wants to fix them.

In FIG. 1, reference numerals 200a to 200i designate those portions, for which the interior and exterior parts are specifically designed in order to retrofit the in-vehicle components. In particular, it is advantageous for a system, according to which circumference of the vehicle is shot by multiple cameras to show a vehicle driver circumferential images and to generate a warning buzzer or a warning label in case of dangerous situation.

Figure 2:
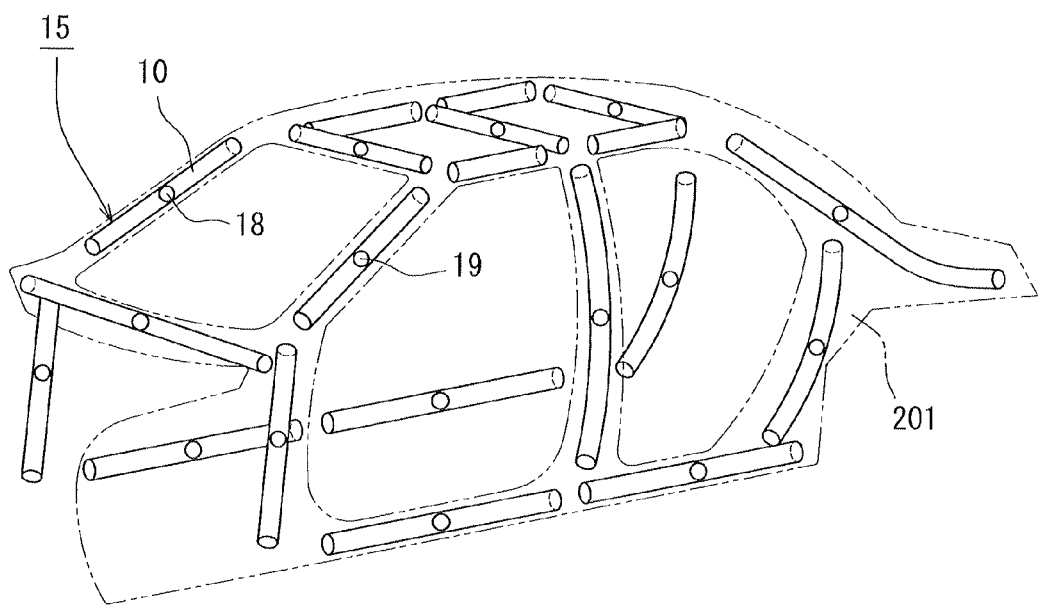
FIG. 2 is a schematic view showing a frame structure, according to which pipe members of unitized wiring portions (wiring units) are assembled in or fixed to a vehicle body of the electric vehicle.

FIG. 2 shows a frame structure 201 for the vehicle body, which is composed of multiple frame members and reinforcing members. A hard pipe member of a unitized wiring portion 15 (also referred to as a wiring unit) is embedded in or fixed along the frame structure 201.

Figure 3:
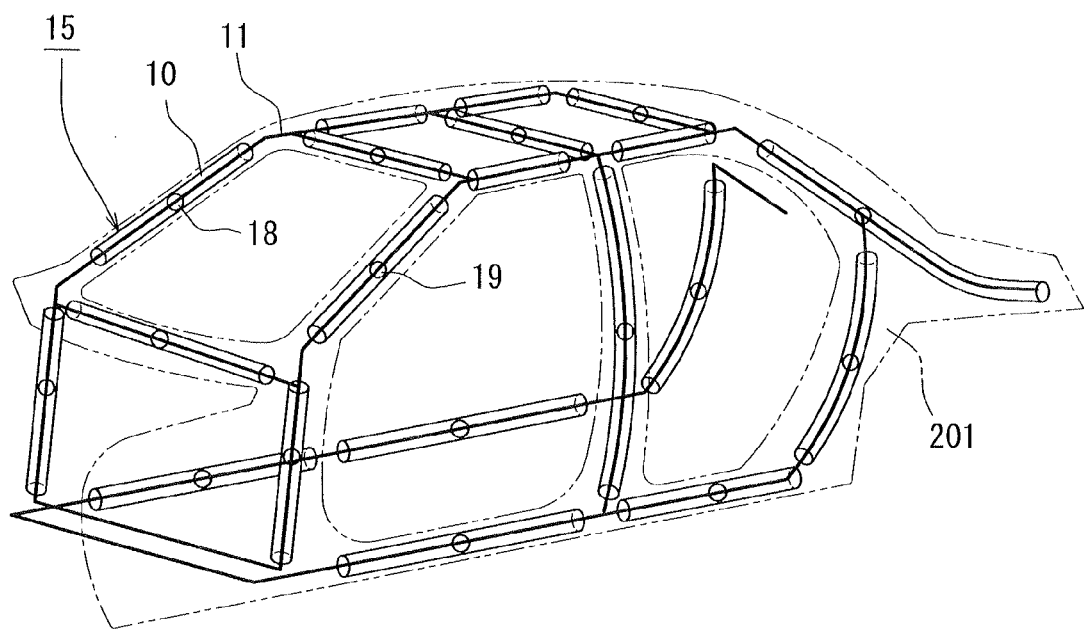
FIG. 3 is a schematic view showing the wiring network for the vehicle, in which wires embedded in and passing through the respective pipe members are connected with each other.

FIG. 3 is a schematic view showing the wiring network for the vehicle, in which wires 11 passing through the respective pipe members 10 are connected with each other. In FIG. 3, the routers 3 and 4 and the retrofitting in-vehicle components, including various kinds of the modules which are afterwards mounted in the vehicle, are omitted.

Figure 4:
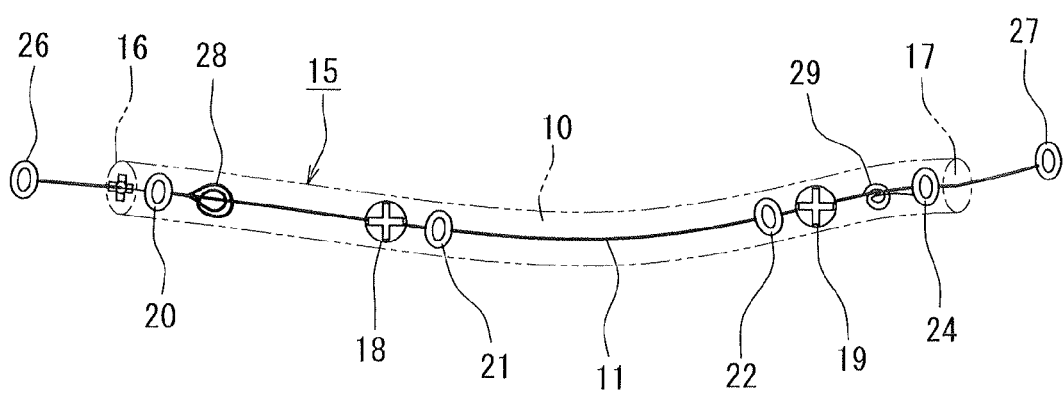
FIG. 4 is a schematic view showing the unitized wiring portion (wiring unit) having the pipe member.

FIG. 4 is a schematic view showing the unitized wiring portion (wiring unit) 15 having the pipe member 10. The wiring unit 15 forms a basic unit for the wiring network, specifications of which are standardized. A plurality of wiring units 15 are prepared in advance and embedded in or fixed to the frame structure 201 shown in FIG. 2 or 3, when the frame structure 201 is assembled. In FIG. 2 or 3, main wiring units 15, which are composed of 20 units, are shown.

The pipe member 10 of the wiring unit 15 is made of a hard metal pipe, which also serves as a reinforcing part. The pipe member 10 may be alternatively made of resin. However, electrically conductive material is preferably used for the pipe member in view of countermeasure for electromagnetic radiation. Detachable cap members (also referred to as bushing members) 16, 17, 18 and 19 are provided at both axial ends and side portions of the pipe member 10.

The cap member (bushing member) has a function not only for holding the wires but also for accommodating parts. The cap members are composed of end cap members 16 and 17 and side cap members 18 and 19. The pipe member 10 is fixed to the frame member or the reinforcing member by means of a fixing saddle or a fixing band, which is screwed to the frame or reinforcing member.

As explained below, the wiring work can be easily done for the retrofitting in-vehicle component by providing the bushing members 16 to 19. The wire 11 has inside wiring connectors 20 to 24 and margin portions 28 and 29 for loose-fitting wiring.

The retrofitting in-vehicle component (not shown) can be easily fixed to vehicle body by the margin portions 28 and 29, namely the wiring operation can be easily done. The neighboring wiring units 15 are respectively connected with each other by outside wiring connectors 26 and 27.

Alternatively, the wiring units 15 may be connected with each other in such a way that the inside wiring connectors 20 and 24 may be brought out to the outside of the pipe member 10 and the wiring connectors 20 and 24 may be used instead of the outside connectors 26 and 27. Furthermore, in this case, the wiring connectors 20 and 24 may be brought back into the pipe member 10 after the connectors 20 and 24 are connected with the other wiring units 15. When the wiring connectors 20 and 24 are brought back into the pipe member 10, as above, it is advantageous in view of water-proofing performance.

The inside wiring connectors 21 and 22 may be brought out of the pipe member 10, if necessary, by the side bushing members 18 and 19 in order that the wire 11 may be connected to the retrofitting in-vehicle component (not shown).

One inside wiring connector (21 or 22) may be provided instead of two inside wiring connectors, or alternatively the inside wiring connectors 21 and 22 may be omitted in case that the pipe member 10 is rather short. In FIG. 2 or 3, each of the wiring units 15 is indicated as such having one side bushing member 18 or 19, only for the purpose of simplified illustration.

As understood from the above explanation, a portion of the wire 11 and/or the inside wiring connector (s) 21 and 22 can be brought out of the pipe member 10 via an opening (or openings) formed at a side portion of the pipe member 10, at which the side bushing members 18 and 19 are attached to the openings. A portion of the wire 11 is fixed to an elastic member (for example, a clip) provided at a rear side of the side bushing member 18/19. The side bushing member 18/19 is attached to the opening after the portion of the wire 11 and the inside connector 21/22 are pushed back into the pipe member 10.

As above, since the opening formed at the side portion of the pipe member 10 is closed by the side bushing member 18/19 after the wire 11 and the inside wiring connector 21/22 are pushed back into the pipe member 10, the wire 11 and the inside wiring connector 21/22 can be easily brought out again from the pipe member 10 when the side bushing member 18/19 is detached from the opening together with the elastic member (e.g. the clip).

The end bushing member 16 and 17 perform several functions, for example, for holding the wire 11, for sealing the inside of the pipe member 10 so that moisture may not come into the inside, and for accommodating electric parts in order to block off the electromagnetic wave (the electromagnetic noise).

Figure 5:
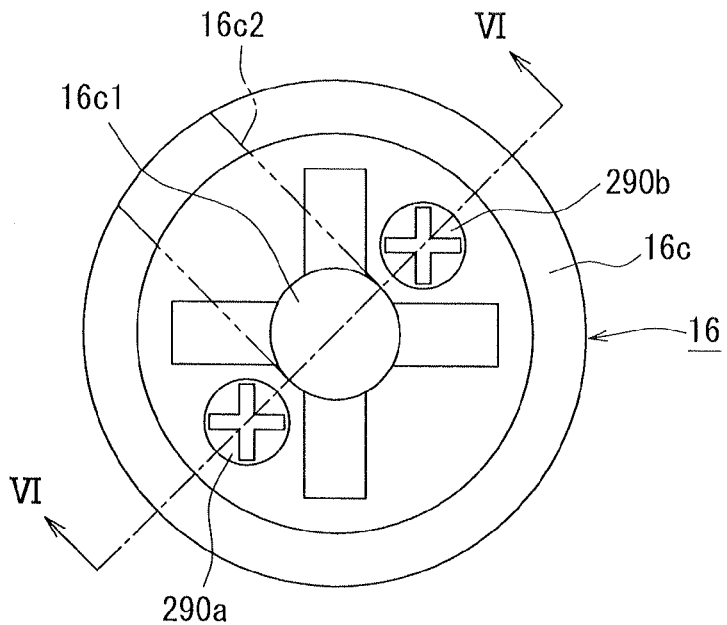
FIG. 5 is a front elevation view showing a bushing member, which is used at an end of the unitized wiring portion.
Figure 6:
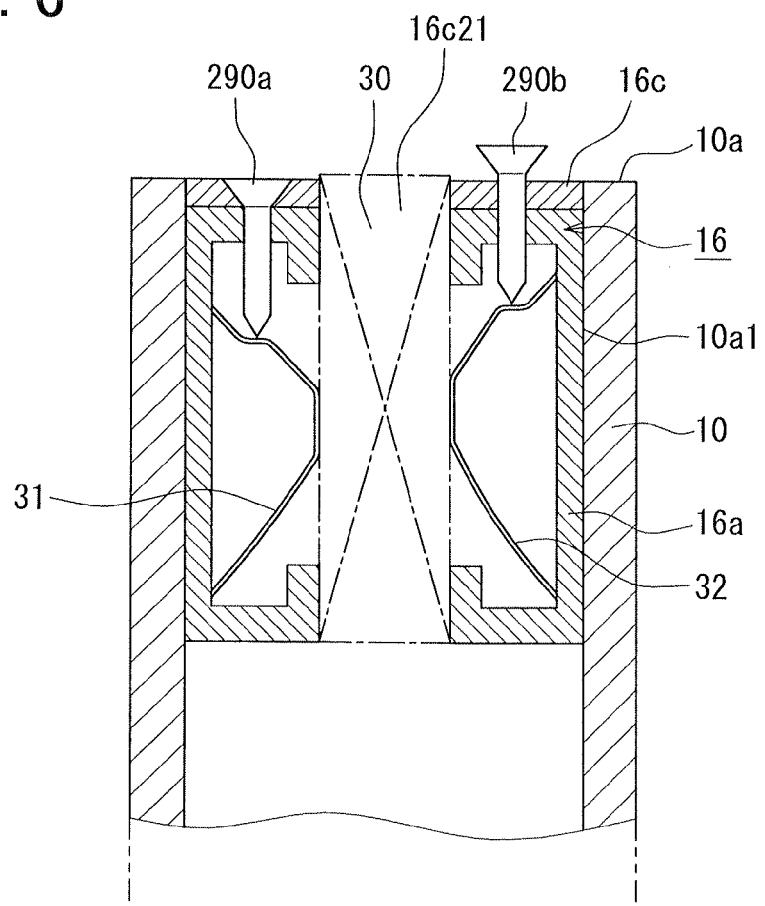
FIG. 6 is a cross-sectional view showing the bushing member taken along a line VI-VI in FIG. 5.

FIG. 5 is a front elevation view showing the end bushing member 16, and FIG. 6 is a cross-sectional view showing the end bushing member 16 taken along a line VI-VI in FIG. 5. A screwed groove 10a1 is formed at an inner surface of an end portion 10a of the pipe member 10. A cylindrical bushing body 16a made of resin is screwed into the inside of the pipe member 10.

A cap sheet 16c made of resin is fixed to an end of the bushing body 16a by small screws 290a and 290b. The end bushing member 16 is composed of the bushing body 16a and the cap sheet 16c. The wire 11 as well as the inside wiring connector 20/21 is inserted through the end bushing member 16 before the end bushing member 16 is attached (screwed) to the pipe member 10. In FIGS. 5 and 6, however the wire 11 is omitted from the illustration.

As shown in FIGS. 5 and 6, a circular hole 16c1 is formed in the cap sheet 16c, through which the wire 11 passes. The circular hole 16c1 may be replaced by a U-shaped groove 16c2. In case of the U-shaped groove 16c2, the wire 11 having the wiring connectors 26, 20, 21, 22, 24, and 27 can be easily inserted into the bushing members 16 and 17.

In FIG. 6, numeral 30 designates a wire supporting space, through which the wire 11 passes. A pair of spring plates 31 and 32 is provided in the bushing body 16a. When the screw 290a/290b is screwed into the cap sheet 16c and the bushing body 16a, a forward end of the screw 290a/290b pushes down an upper portion of the spring plate 31/32, so that a middle portion of the spring plate 31/32 is deformed inwardly in a radial direction of the bushing body 16a. As a result, the middle portion of the spring plate 31/32 is pressed against the wire 11 to fix the wire 11 not only in the radial direction but in the axial direction. Instead of direct contact between the spring plates 31/32 and the wire 11, a flexible sleeve made of resin may be interposed between the spring plates 31/32 and the wire 11 so as to protect the wire 11.

Figure 7:
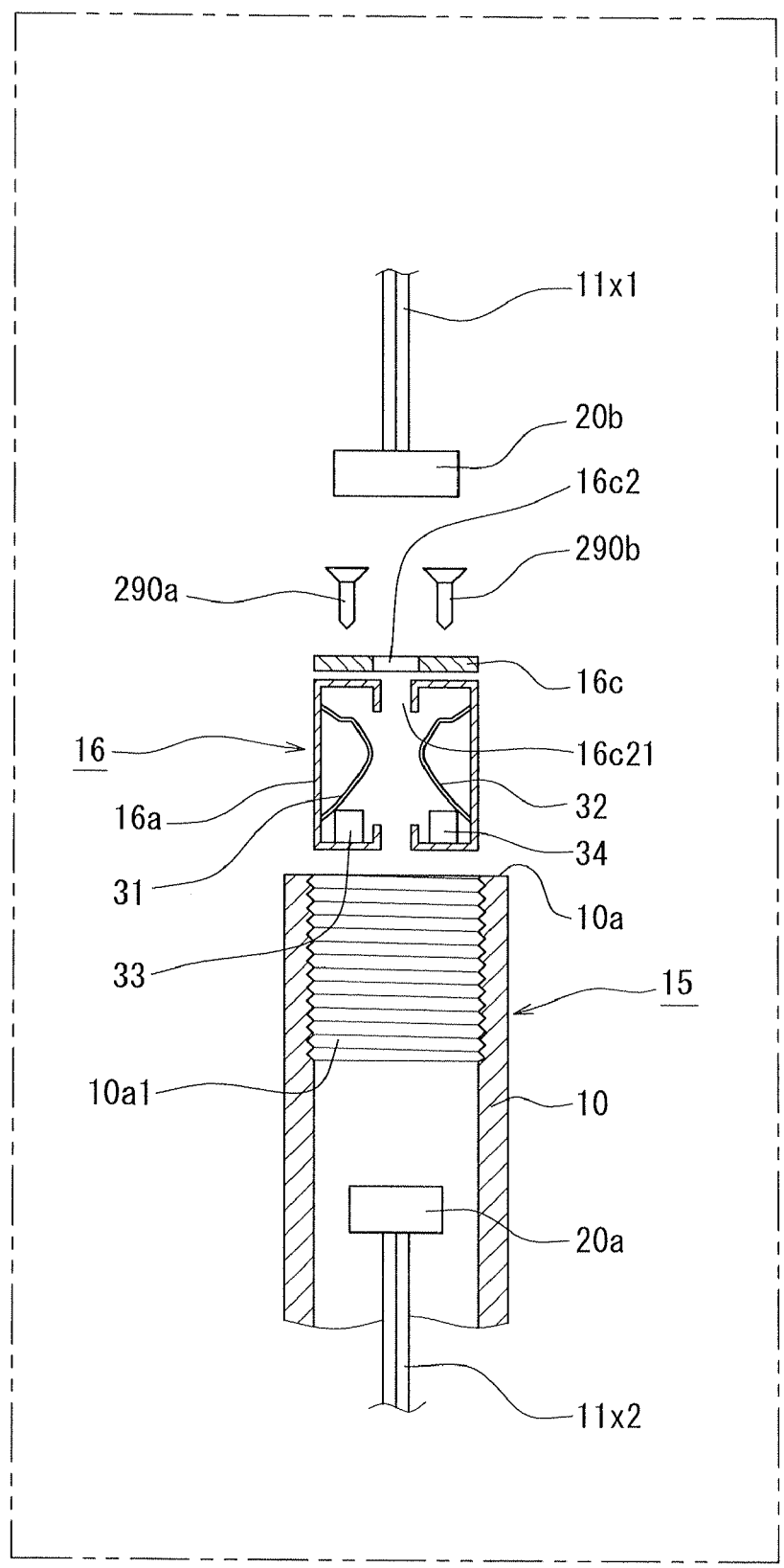
FIG. 7 is a cross-sectional and exploded view (before assembling) showing an end portion of the pipe member according to a modification of the first embodiment, in which a U-shaped groove is formed at the bushing member.

FIG. 7 is a cross-sectional and exploded view (before assembling) schematically showing the end portion of the pipe member 10 according to a modification of the first embodiment, in which the U-shaped groove 16c2 is formed in the cap sheet 16c of the end bushing member 16.

As shown in FIG. 7, when electromagnetic noise is large, electrical parts 33 and 34 may be provided in the end bushing member 16 adjacent to the spring plates 31 and 32, wherein the electrical parts 33 and 34 are made of ferrite core or dielectric material as countermeasure parts for electromagnetic radiation. In FIG. 7, numerals 16c2 and 16c21 designate U-shaped grooves respectively formed in the cap sheet 16c and in the end bushing member 16. The inside wiring connector 20 is divided into parts, a first connector part 20a and a second connector part 20b.

A method for connecting the wire 11x1 of the wiring unit to the wire 11x2 provided in the pipe member 10 of the wiring unit 15 will be explained with reference to FIG. 7. The wire 11x1, which is already fixed to the second connector part 20b, is inserted into the U-shaped grooves 16c2 and 16c21, and then the first and second connector parts 20a and 20b are fixed to each other.

After the first and second connector parts 20a and 20b are fixed to each other, the bushing body 16a of the end bushing member 16 is attached to the end portion 10a of the pipe member 10, namely the bushing body 16a is screwed into the screwed groove 10a1. And the small screws 290a and 290b are inserted (screwed) into the bushing body 16a so that the cap sheet 16c is fixed to the bushing body 16a.

Instead of the U-shaped grooves 16c2 and 16c21, circular holes may be formed in the cap sheet 16c and in the bushing body 16a. In such a case, the wire 11x1 should be inserted through the circular holes of the end bushing member 16, before the wire 11x1 is fixed to the second connector part 20b. Then, the first and second connector parts 20a and 20b are fixed to each other.

In the modification shown in FIG. 7, the inside wiring connector (21/22: not shown in FIG. 7) provided in the back of the pipe member 10 can be brought out of the pipe member 10, when the side bushing member (18/19: not shown in FIG. 7) is detached from the pipe member 10. The first connector part 20a can be brought out from the pipe member 10.

After the first and second connector parts 20a and 20b are fixed to each other, the wire 11x1 is further pulled into the pipe member 10 so that the margin (28: not shown in FIG. 7) is formed. Then, the end bushing member 16 is attached to the end portion 10a of the pipe member 10, wherein the wire 11x1 is held between the spring plates 31 and 32. Finally, the small screws 290a and 290b are screwed into the end bushing member 16, so that the wire 11x1 is firmly supported by the spring plates 31 and 32. Each of the spring plates 31 and 32 works as a wire pressing member.

According to the first embodiment, multiple standardized kinds of the wiring units 15 are prepared in advance, and an appropriate kind of the wiring unit 15 is respectively selected depending on a location to which the wiring unit 15 is fixed. After the wiring units 15 are assembled to the vehicle body, for example, by robots, the outside wiring connectors 26 and 27 are manually connected with each other to complete the wiring network.

Each of the wires 11 accommodated in the space of the respective pipe members 10 has the margin 28/29 (FIG. 4), so that the wire 11 may not be cut out even in case of deformation of the pipe member 10.

The inside wiring connectors 21 and 22 are not always necessary to be provided in the pipe member 10, when the openings (not shown) are not formed in the side portion of the pipe member 10. When the pipe member 10 has a structure in which the openings may be easily formed at the side portion of the pipe member 10, or when the pipe member 10 is made of such material that the openings can be easily formed, it is desirable to provide the inside wiring connectors 21 and 22 to the wire 11 at a predetermined distance.

According to such an arrangement, it becomes easier to bring out the inside wiring connector 21/22 from the pipe member 10 when the side bushing member 18/19 is detached from the opening in order to connect the retrofitting in-vehicle component to the inside wiring connectors 21/22.

In each of the wiring connectors 20, 21, 22, 24, 26 and 27 of the wiring unit 15 shown in FIG. 4, a connector part (not shown) on a side of the vehicle server and a connector part (not shown) on a side of a client are respectively connected to each other. For example, in FIG. 7, when the vehicle server (not shown) is existing at a forward end of the wire 11x1, the connector part 20b is the connector part on the side of the vehicle server, and the connector part 20a is the connector part on the side of the client.

Each of the connector parts 20a and 20b has an ID information portion, to which data for differentiating the connector parts 20a and 20b is stored.

As a result, ID information are respectively collected from the connector parts 20a and 20b, which form one pair of connector parts, upon a command signal from the vehicle server, so that the vehicle server confirms the ID information from the respective connector parts 20a and 20b. In the first embodiment, the pair of connector parts 20a and 20b is referred to as the wiring connector 20, and the ID information from the respective connector parts 20a and 20b is referred to as ID information from the wiring connector 20.

Figure 8:
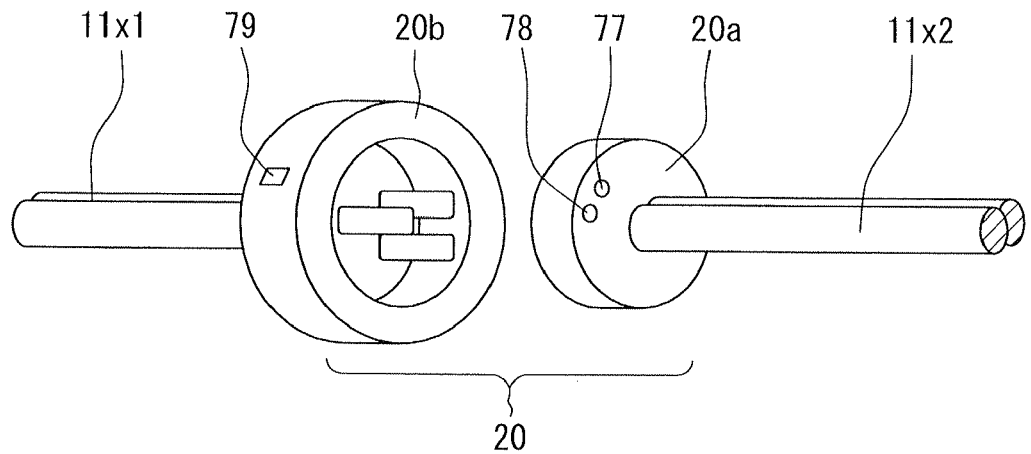
FIG. 8 is a schematic perspective view showing a wiring connector, which is arranged in an inside of the pipe member for connecting wires with each other.

FIG. 8 is a schematic perspective view showing the wiring connector 20 which is arranged in the inside of the pipe member 10 of FIG. 7, wherein the wiring connector 20 has three connector-pins connected to the wires 11x1 and 11x2. A communication control portion 48 is provided in the wiring connector 20, as shown in FIG. 9, for shutting down the communication between the connector parts 20a and 20b, when so requested.

The connector part 20b on the vehicle server side has a function, in cooperation with the communication control portion 48, for shutting down the communication to the connector part 20a, which is the connector part located at a downstream side of the pair of connector parts 20a and 20b. The communication between the connector parts 20a and 20b is carried out in a contact-less manner by use of electromagnetic induction.

Figure 9:
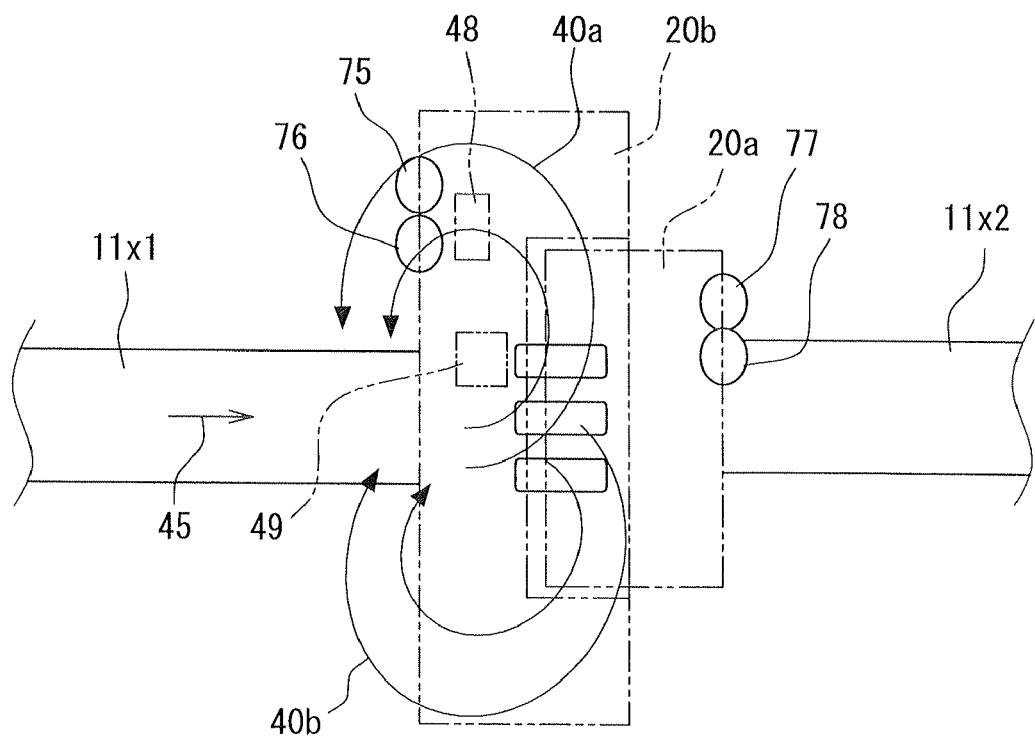
FIG. 9 is a schematic view showing the wiring connector, in which the wires are connected with each other.
Figure 10:
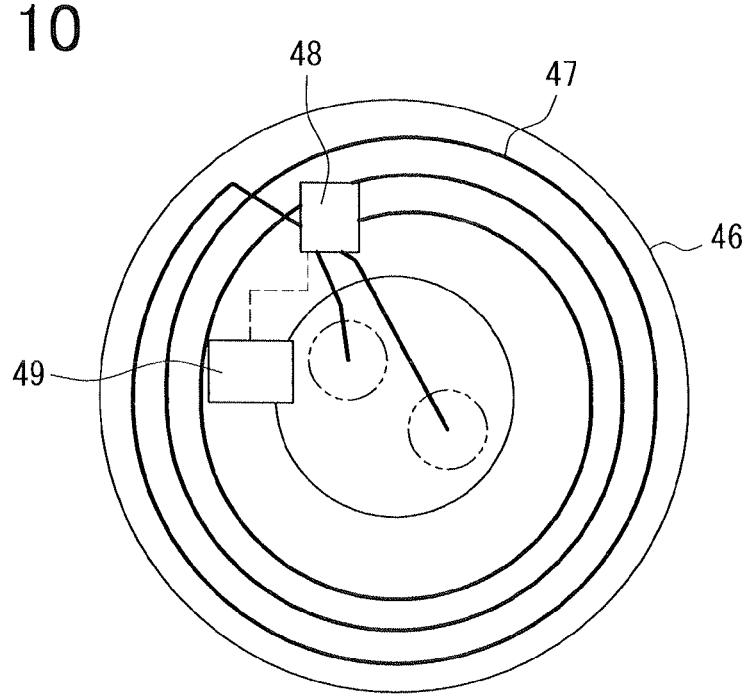
FIG. 10 is a schematic side view showing a coil provided on a printed board arranged within the wiring connector, when viewed in a direction of an arrow 45 in FIG. 9.

FIG. 9 is a schematic view showing the wiring connector 20 (being composed of the connector parts 20a and 20b), in which the three connector pins are inserted into three pinholes. FIG. 10 is a schematic side view showing a coil 47 provided on a printed board 46 arranged within the connector part 20b, when viewed in a direction of an arrow 45 in FIG. 9.

In FIG. 10, the coil 47 is actuated by the communication control portion 48 provided in the connector part 20b to generate magnetic flux 40a and 40b shown in FIG. 9. Numeral 49 in FIG. 9 designates an electrical circuit having the ID information portion (in which ID information is stored) and a power device.

In the first embodiment, the connector parts 20a and 20b are connected to each other by means of the electromagnetic induction. However, they may be connected by any other manners, such as a connection by electrostatic capacity, or any other contact-less communication technology.

The vehicle server detects, based on data communication between the connector parts 20a and 20b, a wiring condition that electric power may not be supplied to a downstream side, for example, due to a damage of the connector part 20a of the downstream side. In addition, it is possible to transmit information relating to a condition of the connector part 20b on the vehicle server side, to the connector part 20a of the downstream side.

Light emitting diodes (LED) 75 to 78 are provided at the connector parts 20a and 20b, so that electrical power condition as well as communication condition may be visually inspected. For example, in the case that the electrical power is not supplied to the connector part 20a of the downstream side, the LED 75 of the connector part 20b of the upstream side is emitted, but the LED 77 of the connector part 20a of the downstream side is not emitted.

The connector parts 20a and 20b can be fixed to each other with positioning. Before connection between the connector parts 20a and 20b, the supply of the electrical power is automatically stopped. When the connector parts 20a and 20b are fixed to each other, a mechanical locking mechanism is turned on. The connector parts 20a and 20b may not be separated from each other unless the mechanical locking mechanism is unlocked.

A number of electrodes for the connector parts 20a and 20b is fixed. However, additional (back-up) electrode may be provided. In FIG. 8, the connector parts 20a and 20b are indicated as having an annular shape. However, the shape is not limited to such annular shape.

A manual switch 79 is provided in the connector part 20b, as shown in FIG. 8, so that shut-down of the electrical power line may be manually done or a switching operation for diagnosis work may be manually done.

Figure 11:
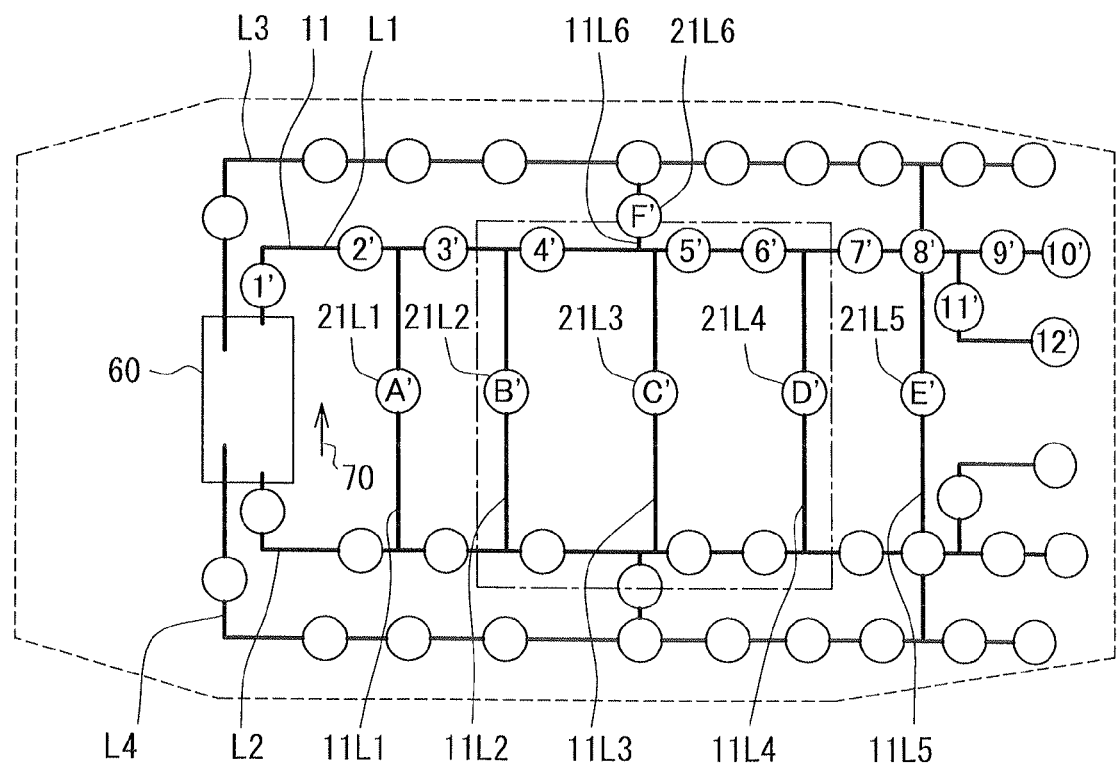
FIG. 11 is a schematic view showing an electrical system for the wiring network of the electric vehicle shown in FIG. 1.

FIG. 11 is a schematic view showing an electrical system for the wiring network of the electric vehicle shown in FIG. 1. In FIG. 11, the wires 11 including the electrical power lines and the communication lines from a communication controller of the vehicle server are arranged in the pipe members 10 and connected via the wiring connectors 20.

In FIG. 11, an assembly of the vehicle server and the battery 1 is indicated by a battery-server module 60. For the purpose of simplification, the outside wiring connectors 26 and 27 (FIG. 4), the routers 3 and 4 (FIG. 1) and other nodules (including the retrofitting in-vehicle components) are omitted from FIG. 11.

As seen from FIG. 3 and FIG. 11, the wiring structure of the wiring units 15 having the pipe members 10 is arranged in a symmetric pattern with respect to a longitudinal line of the vehicle. As shown in FIG. 11 link-up wires (loop wires) 11L1-11L6 are provided in the reinforcing members formed at the roof, so that the link-up wires 11L1-11L6 connect the wires 11 symmetrically arranged at both sides with each other. Link-up connectors 21L1-21L6 are respectively provided in the pipe members 10 for the link-up wires 11L1-11L6, as in the same manner to that of FIG. 4.

If the wiring network on either side (left-hand or right-hand side) is disconnected due to a traffic accident, for example, the vehicle server determines a wiring route which is not damaged so that electrical power supply and information collection are carried out through the link-up connectors 21L1-21L6.

Figure 12:
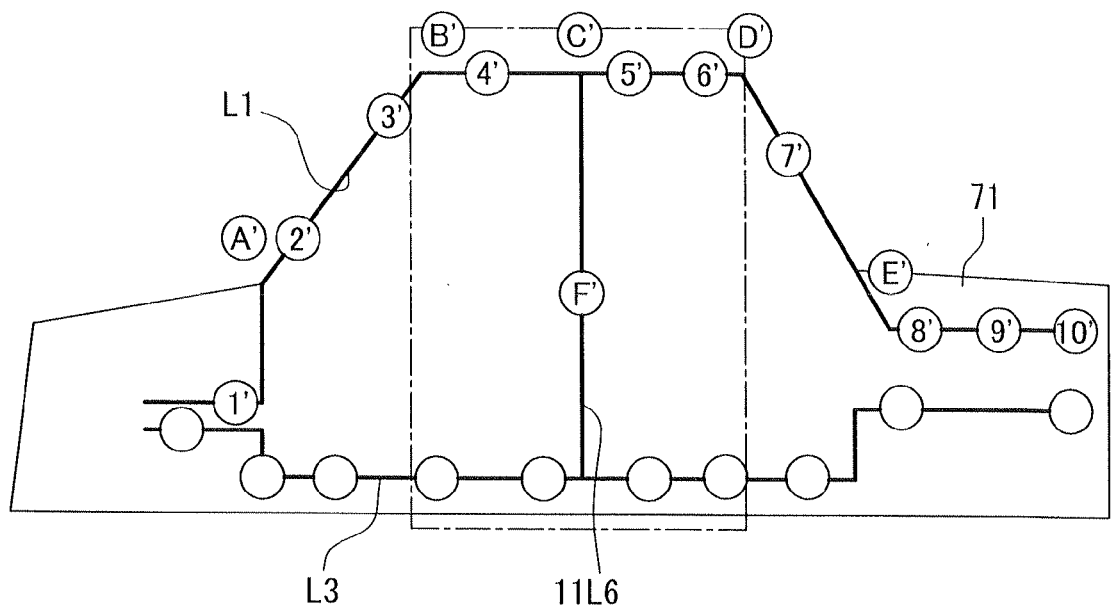
FIG. 12 is a schematic view showing the electrical system for the wiring network, when viewed in a direction of an arrow 70 in FIG. 11.

FIG. 12 is a schematic view showing the electrical system for the wiring network provided in the electrical vehicle, when viewed in an arrow 70 in FIG. 11. In the electrical system shown in FIG. 12, if the wire in a bottom line L3 and/or a roof line L1 is destroyed, a rear lamp and/or an in-vehicle component, which are provided in a module (not shown) arranged in a rear portion 71 of the vehicle, may not be properly operated.

In such a situation, the communication controller of the vehicle server in the battery-server module 60 investigates a connector network in the wiring network to identify a damaged location and searches a wiring line to the rear lamp and the in-vehicle component for the rear-side communication in the rear portion 71. Then, the communication controller of the vehicle server carries out the electrical power supply and the communication to the rear lamp of the rear portion 71 and the in-vehicle component through one or some of the link-up connectors 21L1 to 21L6.

Each of the in-vehicle components provided in the module at the rear portion 71 sends a starting signal to the vehicle server, when the in-vehicle component is activated again from a halt condition (non-operation state) after it is disconnected from the vehicle serve. When the starting signal is received by the vehicle server, the vehicle server determines that the in-vehicle component has been restored to its former state (normal operating state).

Each of connector parts of the link-up connectors 21L1-21L6 also has an ID information portion, which stores data indicating that it is the link-up connector. In addition, a color of insulation for the link-up wires and/or the link-up connectors may be changed from that for the main wiring line.

When the main wiring line is in a normal operating condition, the electrical power and communication data are not transmitted via the link-up wires 11L1-11L6. When any malfunction occurs in the main wiring line, the link-up connectors 21L1-21L6 of the link-up wires 11L1-11L6 are turned on (in a conductive state) so that the electrical power and the communication data are supplied to the in-vehicle components to which the electrical power supply is required.

Figure 13:
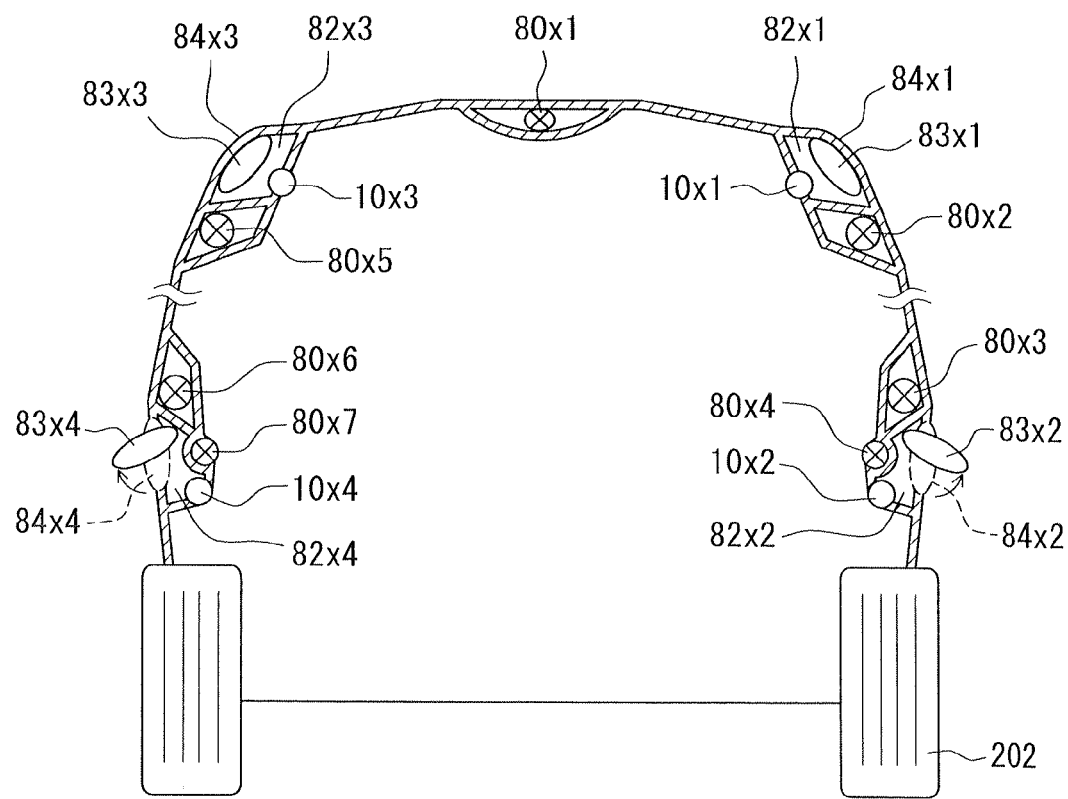
FIG. 13 is a schematic cross sectional view showing a portion of a vehicle body, in which locations of the pipe members, shapes of recessed portions of the vehicle body for the pipe members, and conditions for retrofitting devices are indicated.

A structure for fixing the retrofitting in-vehicle component according to the first embodiment will be explained. According to the first embodiment, the retrofitting in-vehicle component is a monitoring camera for monitoring the circumference of the vehicle. FIG. 13 is a schematic cross sectional view showing a portion of the vehicle body cut away on a plane perpendicular to the vehicle longitudinal direction. FIG. 13 shows locations of the pipe members 10x1-10x4, shapes of metal recessed portions 82x1-82x4 of the vehicle body formed in neighborhood of the pipe members and conditions of the retrofitting in-vehicle components 83x1-83x4 mounted in the recessed portions.

According to a structure of the vehicle body, which is called as a monocoque body, reinforcing members are provided at a roof portion, side body portions, and a bottom portion of the vehicle. Namely, FIG. 13 shows the locations of the pipe members 10x1-10x4, the reinforcing members 80x1-80x7, the recessed portions 82x1-82x4 formed by recesses of the frame members, and the retrofitting in-vehicle components 83x1-83x4 mounted in the recessed portions 82x1-82x4. Numeral 202 designates a tire.

The roof portion, the side body portions, and the bottom portion of the vehicle are reinforced by the reinforcing members 80x1-80x7. In FIG. 13, a mark "x" is added to each portion of the reinforcing members, in order to easily differentiate the reinforcing members 80x1-80x7 from the pipe members 10x1-10x4.

The retrofitting in-vehicle components 83x1-83x4, each of which is composed of a camera assembly for monitoring the circumference of the vehicle, are fixed to the respective recessed portions 82x1-82x4, after each of the covers 84x1-84x4 is detached from the respective recessed portions 82x1-82x4.

In FIG. 13, the covers 84x1 and 84x3 are attached to (namely, closing) the recessed portions 82x1 and 82x3, so that the in-vehicle components 83x1 and 83x3 are not available for operation. However, whenever the covers 84x1 and 84x3 are detached from the recessed portions 82x1 and 82x3, the camera assembly in each of the retrofitting in-vehicle components 83x1 and 83x3 becomes ready for use.

The covers 84x1 and 84x3 are attached to the recessed portions 82x1 and 82x3, which accommodate the camera assemblies, in order that humidity therein may not be increased. A seal member made of rubber, for example, may be provided at the vehicle body surrounding the respective recessed portions 82x1 and 82x3 or may be provided at an outer periphery of each cover 84x1 and 84x3. Covers 84x2 and 84x4 are detached from the recessed portions 82x2 and 82x4, so that a camera assembly in each of the retrofitting in-vehicle components 83x2 and 83x4 is ready for use.

As above, the pipe members 10x1-10x4 of the wiring units 15 (FIG. 4) are respectively arranged in the recessed portions 82x1-82x4 formed in the frame members or the reinforcing members of the vehicle body of FIG. 13, and the wiring units 15 are connected to each other via the outside wiring connectors 26 and 27 (FIG. 4), to thereby form the wiring network for the vehicle body.

A size for the recessed portions 82x1-82x4 may be standardized when a standard size for the in-vehicle components 83x1-83x4 is decided in advance. Since the in-vehicle component 83x1-83x4 may have a moving portion, it is desirable to set a guideline for a shape and size for such in-vehicle component, so that the moving portion may not be brought into contact with an inner surface of the recessed portion 82x1-82x4.

The shape of the covers 84x1 and 84x3 is so designed to be unified to the vehicle body, so that the recessed portions 82x1 and 82x3 may not be visible. The covers 84x1 and 84x3 are detachable from the recessed portions 82x1 and 82x3.

The wires 11 of the wiring units 15 respectively arranged in the recessed portions 82x2 and 82x4 are kept in a nonconductive condition, until the camera assemblies 83x2 and 83x4 (that is, the retrofitting in-vehicle components to be mounted afterwards in the vehicle) are mounted. In the case that the other in-vehicle components are already mounted (whether originally equipped or retrofitting) and the electrical power supply as well as the data communication is being carried out, the wires 11 are maintained in the conductive condition.

When the camera assembly is mounted to the vehicle, the side bushing members 18 and 19 are detached from the side portion of the pipe member 10 and the inside wiring connectors 21 and 22 are brought out from the pipe member 10. The inside wiring connectors 21 and 22 are connected to a connector of the camera assembly. More exactly, connector parts of the wiring connectors 21 and 22 are respectively detached (separated) from each other, and such detached connector parts are respectively connected to corresponding connector parts of the camera assembly.

When the retrofitting in-vehicle components 83x2 and 83x4 are mounted in the (inside-purpose) recessed portions 82x2 and 82x4 of the vehicle shown in FIG. 13, the covers 84x2 and 84x4 may be made in a simpler manner than the covers 84x1 and 84x3 for the (outside-purpose) recessed portions 82x1 and 82x3. For example, the covers 84x2 and 84x4 may be simply fixed to the vehicle body by means of screws or may be fixed to the vehicle body through one-touch operation by use of a spring.

Figure 14:
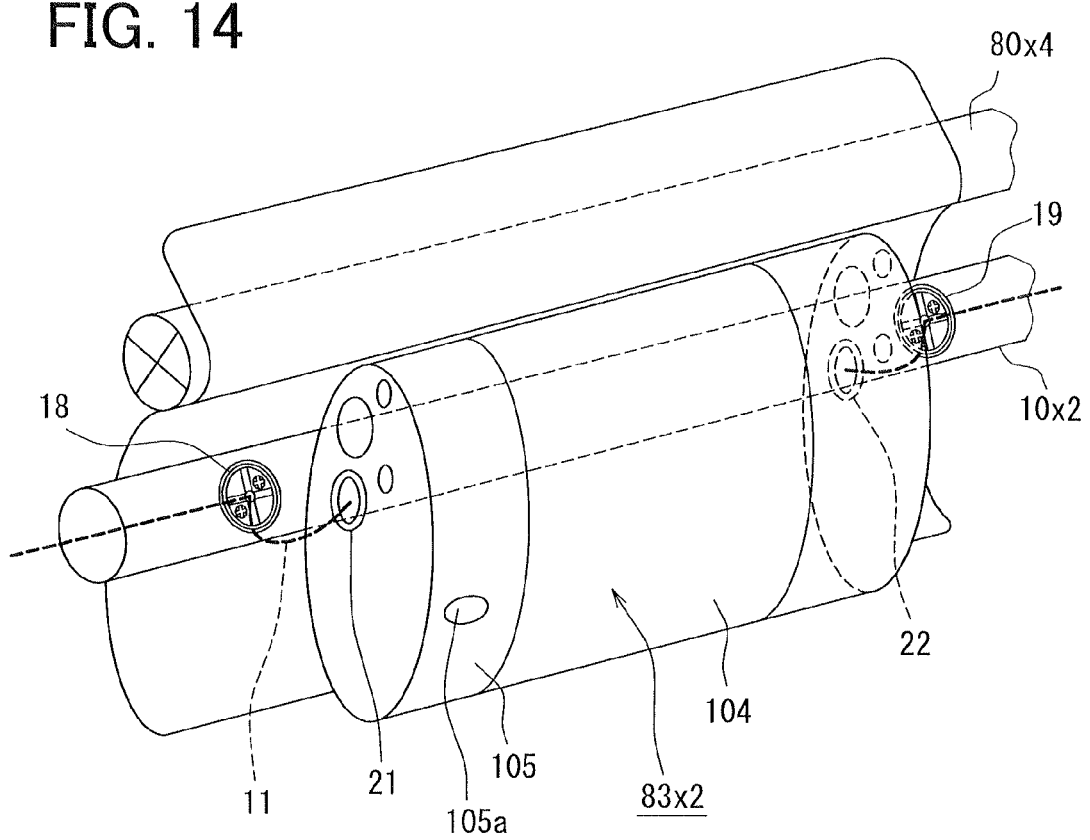
FIG. 14 is a schematic perspective view showing a connecting structure for a camera assembly (an example of the retrofitting devices) and the wires in the pipe member.

FIG. 14 is a schematic perspective view showing a connecting structure for the wire in the pipe member 10x2 and the camera assembly 83x2 (the retrofitting in-vehicle component) accommodated in the recessed portion 82x2 (FIG. 13). As shown in FIG. 14, when the cover 84x2 (FIG. 13) is detached from the recessed portion 82x2, the side portion of the pipe member 10x2 of the wiring unit 15 and the side bushing members 18 and 19 provided on the side portion can be seen from the outside.

The side bushing members 18 and 19 can be detached from the side portion of the pipe member 10x2 by a screw driver. When the side bushing members 18 and 19 are detached from the pipe member 10x2, the wire 11 and the inside wiring connectors 21 and 22 can be seen from the outside.

The wire 11 is brought out from the pipe member 10x2 through the openings of the side portion of the pipe member 10x2, after the side bushing members 18 and 19 are detached from the pipe member 10x2. The inside wiring connectors 21 and 22 are respectively divided into the connector parts, each of which is connected to the corresponding connector parts of the retrofitting in-vehicle component 83x2, so that the retrofitting in-vehicle component 83x2 is brought into a ready condition for operation.

As already explained, each of the connector parts of the inside wiring connectors 21 and 22 has the ID information portion. When the camera assembly 83x2 (the retrofitting in-vehicle component) is connected to the wiring unit 15, the electrical power is automatically supplied to the camera assembly and data communication starts.

A switch 105a may be provided for starting the data communication after the camera assembly 83x2 is connected to the wiring unit 15. When the vehicle server detects turn-ON switch operation, the vehicle server sends to the camera assembly 83x2 location information of the camera assembly based on the wiring topology as well as a program (software) for manipulating the camera assembly depending on a fixed direction of the camera assembly to the vehicle body, so that the above location information and the program may be stored in a memory device of the camera assembly.

After the camera assembly is fixed to the vehicle body, direction of the camera assembly is adjusted so that a camera angle is located at a desired position. The camera angle can be adjusted to move upwardly or downwardly.

Figure 15:
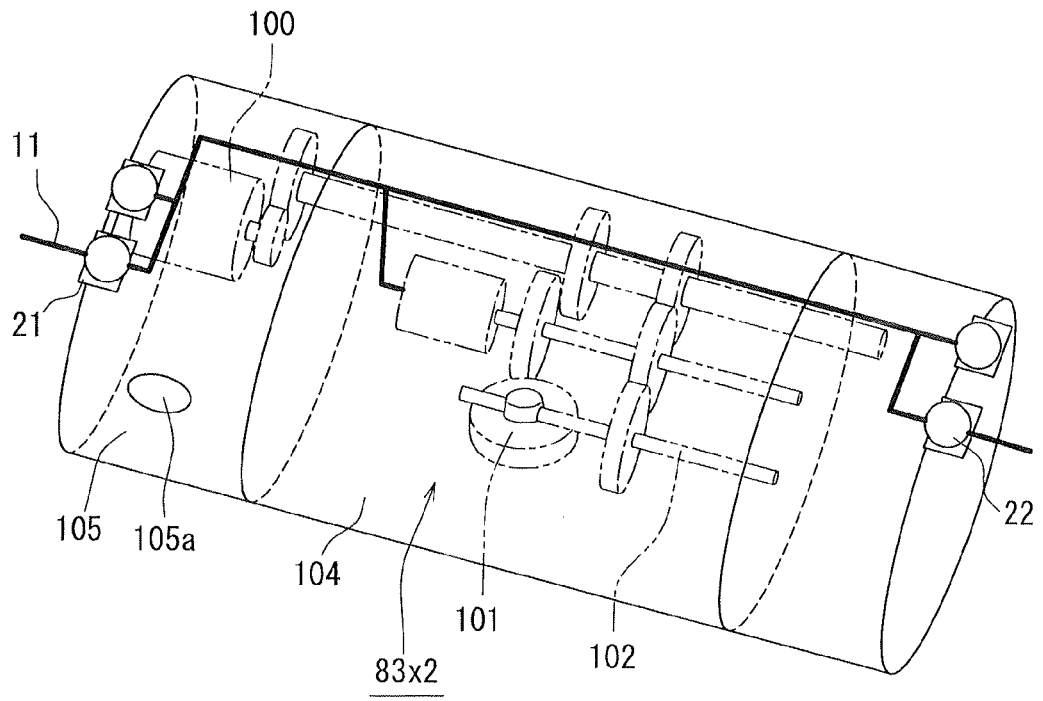
FIG. 15 is a schematic perspective view showing the camera assembly (the retrofitting device) mounted in the recessed portion.

FIG. 15 is a schematic perspective view showing the camera assembly (the retrofitting in-vehicle component 83x2). When the camera angle in the vertical direction is decided, an initial position of an electric motor 100 for driving a camera body 101 is decided.

The camera body 101 is driven by the electric motor 100 via a power transmitting mechanism having multiple rotating shafts 102. The camera body 101 is fixed to the rotating shaft 102 after adjusting the position thereof, so that the camera body 101 is properly moved.

Alternatively, a relative position between a main box 104 accommodating the camera body 101 and a side box 105 including the electric motor 100 may be adjusted to fix a relative angle between the main box 105 and the side box 104.

Figure 16A:
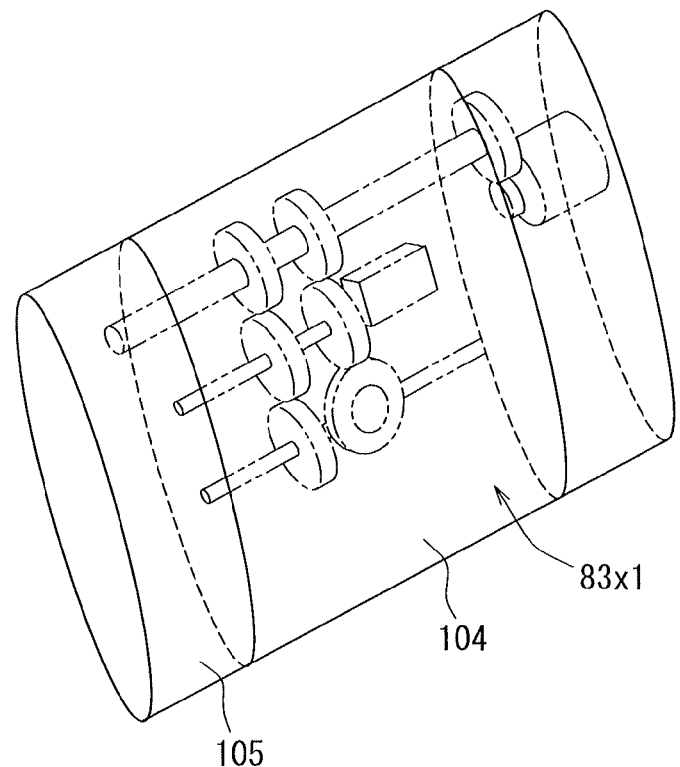
Figure 16B:
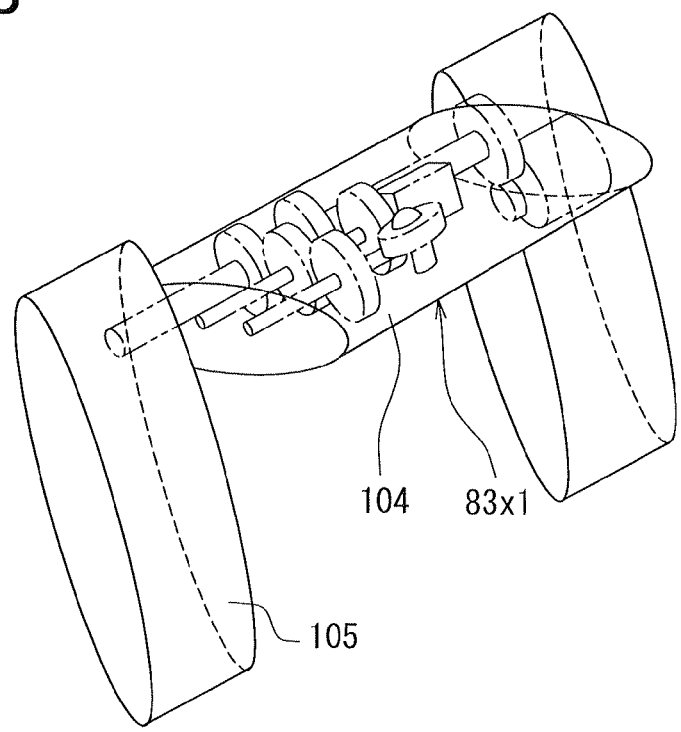

FIGS. 16A and 16B are schematic perspective views showing movements of the camera assembly of the in-vehicle component 83x1, which is mounted to a right-hand side of a vehicle ceiling in FIG. 13. After the cover 84x1 is detached from the recessed portion 82x1 (FIG. 13) the main box 104 is rotated to turn out from the side box 105, as shown in FIG. 16B, so that the camera body is directed, for example, toward a side of the vehicle to monitor an area of the vehicle side.

Next, a method for deciding the wiring topology for the wiring network will be explained. As already explained above, the wiring network is formed as shown in FIG. 11 and FIG. 12. Namely, there are four main wiring lines, including a pair of roof lines L1 and L2 and a pair of bottom lines L3 and L4, as shown in FIG. 11.

The link-up connectors 21L1-21L6 are kept in non-conductive condition, before the wiring topology is decided. This is possible because the vehicle server of the battery-server module 60 shown in FIG. 11 in advance stores in its memory the data relating to ID information and location of the link-up connectors 21L1-21L6. And the vehicle server is so designed as to send a command signal to the link-up connectors 21L1-21L6 and to make them in the non-conductive condition.

The vehicle server sets the link-up connectors 21L1-21L6 to the non-conductive condition as above, in order to confirm all of the ID information of the wiring connectors. In FIGS. 11 and 12, the wiring connectors are designated by "1'" to "12'", each of which is connected in the roof line L1.

The link-up connectors are designated by "A'" to "F'" in FIGS. 11 and 12.

Figure 17:
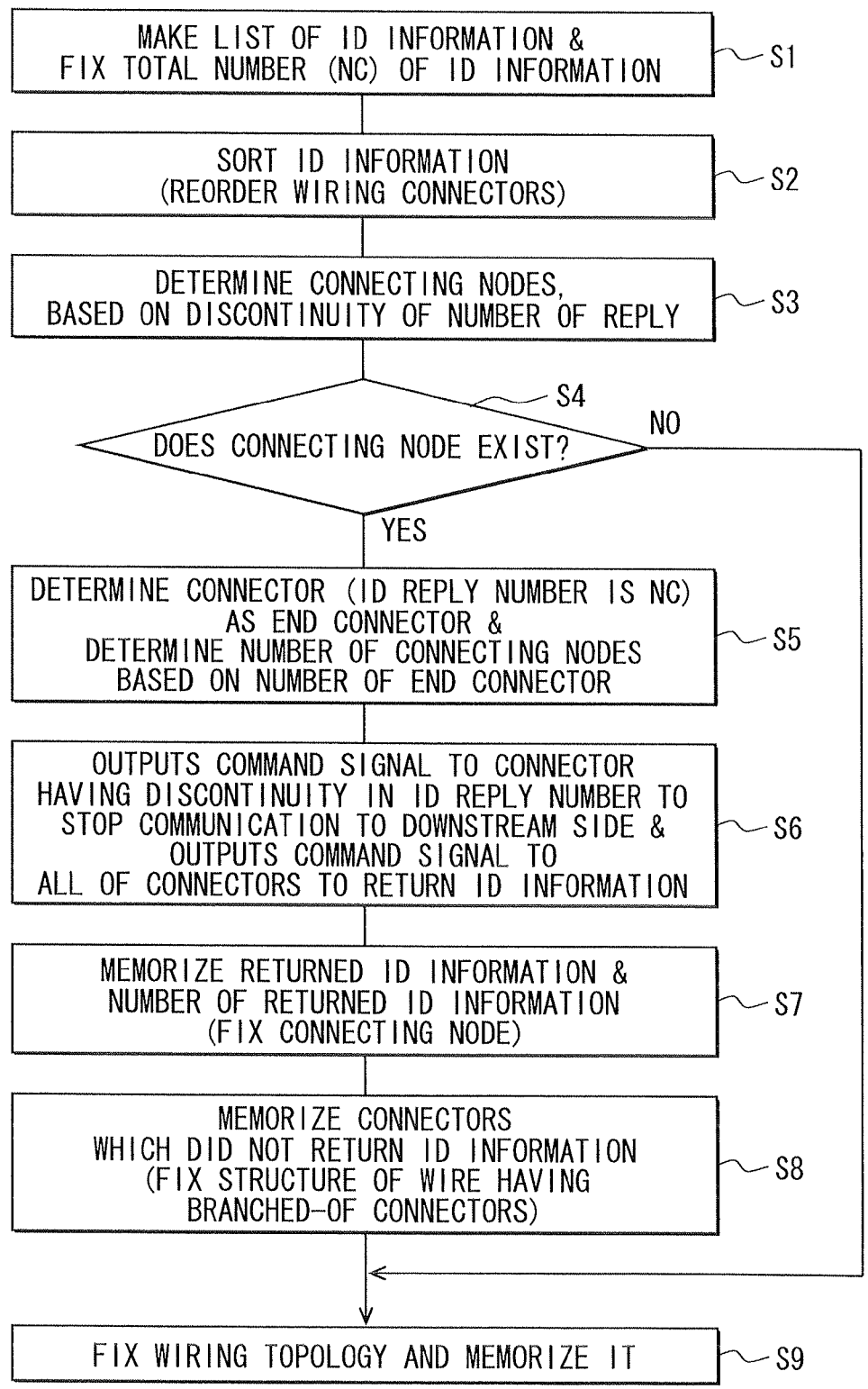
FIG. 17 is a flowchart showing a process for deciding a wiring topology for wiring connectors provided in a roof line and the wires shown in FIG. 11.

FIG. 17 is a flowchart showing a process for deciding the wiring topology for the wiring connectors provided in the roof line L1 and the wires shown in FIG. 1

(Step S1)

At first, at a step S1 of FIG. 17, the vehicle server makes a list of ID information for the wiring connectors. For that purpose the vehicle server sends a (first) command signal to each of the wiring connectors 1' to 12' of the designated main line (for example, the roof line L1 of FIG. 11), so that each of the wiring connectors 1' to 12' returns its ID information to the vehicle server. The vehicle server receives the ID information of the wiring connectors within a predetermined time and stores the ID information in its memory device.

The vehicle server sends a (second) command signal to one (randomly selected) of the wiring connectors which sent back replies to the vehicle server in response to the first command signal, so that such randomly selected first wiring connector may not send back the reply thereafter. Then, the vehicle server sends again another (third) command signal to each of the wiring connectors to return its ID information to the vehicle server.

The vehicle server receives the ID information, which is returned to the vehicle server within the predetermined time, and fixes and stores the ID information in its memory device. The vehicle server again sends a further (fourth) command signal to another one (randomly selected but different from the first one) of the wiring connectors which sent back a reply in response to the third command signal, so that such randomly selected second wiring connector may not send back the reply thereafter. Then, the vehicle server sends again a further (fifth) command signal to each of the wiring connectors to return its ID information to the vehicle server.

By repeating the above processes, the vehicle server collects ID information from all of the wiring connectors of the roof line L1 and fixes them. A number of the ID information is designated by "Nc", that is twelve from "1'" to "12'" in this case.

The above process has an advantage in more surely being able to collect and register all of the ID information, even if there were communication error, when compared with a case in which command signal is sent only one time to all of the wiring connectors to return its ID information to the vehicle server and only such ID information among ID information, which are returned and confirmed, are registered.

The vehicle server stores the number "Nc" of the ID information for the wiring connectors. In this case, the ID information for the wiring connectors are not lined up in an order of a distance close to the vehicle server, but at random.

(Step S2)

At a step S2, the vehicle server selects one of ID information for the wiring connectors, which are randomly lined up. The vehicle server sends to the wiring connector of such selected ID information a command signal for stopping communication toward a downstream side.

Then, the vehicle server sends a command signal to all of the wiring connectors to return its ID information. The above process is repeatedly carried out for all of wiring connectors, for which the ID information has been registered. The vehicle server, then, investigates how many replies of the ID information are made for the respective wiring connectors.

In the above process, since the communication toward the downstream side from the designated (selected) wiring connecter is prohibited, the reply from the downstream side wiring connector(s) is not made from the designated wiring connector. Therefore, the reply is only from the designated wiring connector and any wiring connectors arranged at an upstream side thereof.

More exactly, in the case that the wiring connector 3' is designated, the wiring connectors 4' to 12' which are located at the downstream side of the wiring connector 3', do not send back the reply. In other words, the only the wiring connectors 1' to 3' send back their replies to the vehicle server. Therefore, in this case, the vehicle server fixes the number of reply for the wiring connector 3' as "three (3)".

As a result of the above process, the list for ID information is so changed that the wiring connector having a smaller number of replies is regarded as such wiring connector closer to the vehicle server. In FIG. 11, the wiring connector closer to the vehicle server has a smaller number of replies. The number of replies is continuously increased one by one towards the downstream side.

(Step S3)

At a step S3 of FIG. 17, the vehicle server determines whether there is a connecting node or not. When there is the connecting node, the number of replies becomes discontinuous. Therefore, the vehicle server determines whether the wire has the connecting node or not based on the determination of the discontinuity. When there is no connecting node, the process goes to a step S9, at which the vehicle server fixes and stores in the memory device the wiring topology in which the ID information (the wiring connectors) are listed up in the order of the number of replies (from smaller to larger number).

For example, in FIG. 11, the number of reply for the wiring connector 1' is one, while the number of reply for the wiring connector 5' is five. The vehicle server determines, therefore, that the wiring connector 1' is located at a position closest to the vehicle server.

Each of the link-up connectors 21L1-21L6 sends a reply including the ID information showing that it is the link-up connector, as already explained. The vehicle server stores in advance in the memory the ID information and location for the link-up connectors 21L1-21L6.

In addition, although the wiring connector 8' sends the reply of eight ID information, the wiring connector 9' sends the reply of eleven ID information. The wiring connector 11' also sends the reply of eleven ID information. As above, the number of reply becomes discontinuity, from eight (8) to eleven (11). The vehicle server determines that there is the connecting node.

(Step S4)

At a step S4, the process goes to either the step S9 or a step S5, depending on the determination at the step S3 whether there is the connecting node or not.

(Step S5)

In the case that there is the connecting node, the process goes to the step S5 of FIG. 17, at which the wiring connector having the number of reply corresponding to the number of the ID information "Nc" (the total number of the ID information) is decided as an end wiring connector. The vehicle server decides a number of the branched-off wiring connectors based on the number of the end wiring connector.

In the case of FIG. 11, the number of reply for the wiring connector 10' is twelve (12), while the number of reply for the wiring connector 12' is also twelve (12), so that they coincide with the above total number of "Nc" which is twelve (12). Accordingly, the wiring connector 10' and the wiring connector 12' can be decided as the end wiring connectors. And the vehicle server determines that the number of the branched-off wiring connectors is two (2).

(Step S6)

At a step S6, the vehicle server outputs a command signal to the wiring connectors 9' and 11', at which the number of reply becomes discontinuity, to stop the communication toward the downstream sides hereof. At the same time, the vehicle server outputs a command signal to all of the wiring connectors to send reply.

(Step S7)

At a step S7, the vehicle server stores in the memory the ID information which is sent back and the number of sent-back ID information. According to the above process, the vehicle server determines that the wiring connectors 9' and 11' are branched off at a downstream side of the wiring connector 8', and that there are eight wiring connectors 1' to 8' before the connecting node (branch-off point). As above the vehicle server determines the connecting node and the wiring connectors before the connecting node.

(Step S8)

At a step S8, the vehicle server stores in the memory the ID information for the wiring connector (s) which did not send reply as a result of the command signal at the step S6 to the wiring connector (at which the number of reply becomes discontinuity) for stopping the communication towards the downstream side. In the case of FIG. 11, the wiring connectors 10' and 12' are stored as those wiring connectors which did not send reply to the vehicle server. As a result, a structure of the wires having the branched-off wiring connectors is fixed.

(Step S9)

At the step S9, the fixed wiring topology is stored in the memory or renewed. According to the above process, the ID information for the wiring connectors of the one main line L1 as well as locations of the link-up connectors A' to F' (FIG. 1) are decided. Since the ID information of the link-up connectors A' to F' is different from the ID information for the wiring connectors 1' to 12', the vehicle server differentiates the link-up connectors A' to F' from the wiring connectors 1' to 12'.

In addition, the vehicle server stores in advance the information for the location of the link-up connectors A' to F'. Therefore, the vehicle server decides the locations for the respective wiring connectors based on the locations of the link-up connectors A' to F'. As above, the vehicle server decides the wiring topology for the roof line L1 FIG. 11 and stores the fixed topology in its memory device.

Similar processes are carried out for the other main lines L2, L3 and L4 so that topologies for the respective lines are decided and stored in the memory device of the vehicle server.

When any one of the wiring connectors is detached by a user, the ID information of the detached wiring connector is sent to the vehicle server. As explained with reference to FIGS. 8 and 9, each of the wiring connector 20 is composed of the pair of the connector parts 20*a* and 20*b*. When the connector parts 20*a* and 20*b* are separated, the ID information of such separated connector parts 20*a* and 20*b* is sent to the vehicle server.

As a result, the vehicle server stores which of the wiring connectors is detached by the user. The vehicle server outputs a command signal to such detached wiring connector and stops the electrical power supply and the communication to the detached wiring connector. When the retrofitting in-vehicle component is mounted in the vehicle by the user, and the retrofitting in-vehicle component is connected to the above detached connector parts the vehicle server starts with the electrical power supply to such wiring connector upon receiving a request for the electrical power supply.

The vehicle server receives the ID information of the wiring connector to which the retrofitting in-vehicle component is connected as well as the ID information of the retrofitting in-vehicle component itself so that the vehicle server stores in the memory what kinds of retrofitting in-vehicle component is connected to the detached wiring connector. The retrofitting in-vehicle component mounted in the vehicle has the information relating to a model number, a manufacturer, function, specifications for communication, and major command set. The above information is sent to the vehicle server.

Whenever any new in-vehicle component is connected to the wiring connector, the ID information of the wiring connector to which the new in-vehicle component is connected is likewise sent to the vehicle server. At the same time, the ID information of the newly connected in-vehicle component is also sent to the vehicle server.

When the retrofitting in-vehicle component is connected to the wiring network and starts communication with the vehicle server, the retrofitting in-vehicle component may grasp what kinds of communication pathway to the vehicle server exist. Each of the connector parts of the pair (for example, 20*a* and 20*b* shown in FIG. 8) sends its ID information to the vehicle server. The vehicle server determines from the contents of the ID information, which of the connector parts form the pair, so that the vehicle server treats the ID information from the respective connector parts forming the pair as single ID information from the same wiring connector.

As above, each of the wiring connectors has the following functions:

(1) the wiring connector receives the command signal from the vehicle server;

(2) the wiring connector sends back its ID information to the vehicle server;

(3) the wiring connector (one of the connector parts, usually the upstream side connector part) reads ID information of the neighboring connector part (usually the downstream side connector part) and sends such ID information to the vehicle server; and (4) the wiring connector stops the electrical power supply and the communication to the downstream side wiring connector(s).

Second Embodiment

Figure 18:
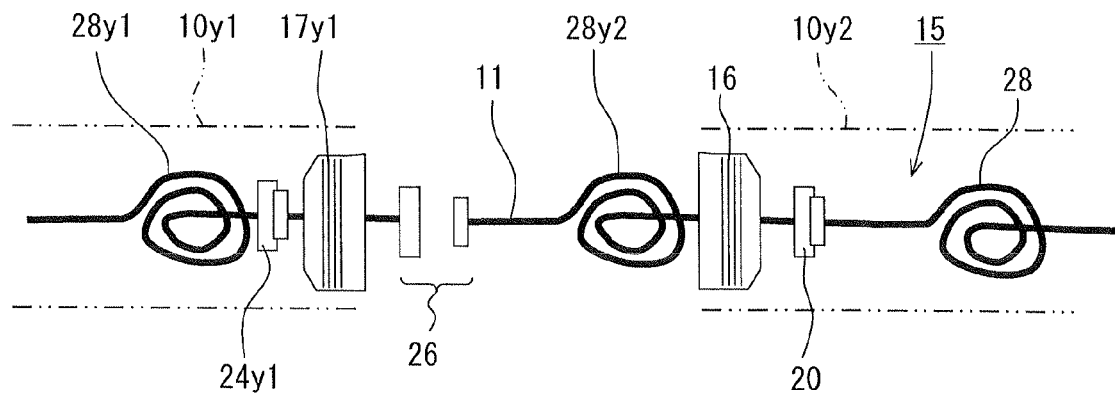
FIG. 18 is a schematic view showing a wire, wiring connectors and bushing members according to a second embodiment.

A second embodiment will be explained. The same reference numerals of the first embodiment are used for the same or similar parts and/or portions in the second embodiment, to thereby omit the explanation thereof. FIG. 18 is a schematic view showing a wire and bushing members according to a second embodiment.

In FIG. 18, pipe members 10*y*1 and 10*y*2 for accommodating the wire 11 are indicated by two-dot-chain lines. It is not always necessary to accommodate all portions of the wire 11 in the pipe member. A portion of the wire 11, which is not accommodated in and not covered by the pipe member, may be directly embedded in the frame member and/or the reinforcing member of the vehicle body so that the wire may be protected by them.

In FIG. 18, related parts are arranged in the following order, when viewed from the side of the vehicle server (namely, viewed from the upstream side); a margin portion 28*y*1; an inside wiring connector 24*y*1; a bushing member 17*y*1; the outside wiring connector 26; a margin portion 28*y*2; the bushing member 16; the inside wiring connector 20; and the margin portion 28.

The margin portion 28*y*2 is provided outside of the pipe members 10*y*1 and 10*y*2. Even when the vehicle body is deformed to a small extent, deformation of the wire may be absorbed by the margin portions 28*y*1, 28*y*2 and 28, so that disconnection of the wire is suppressed.

Figure 19:
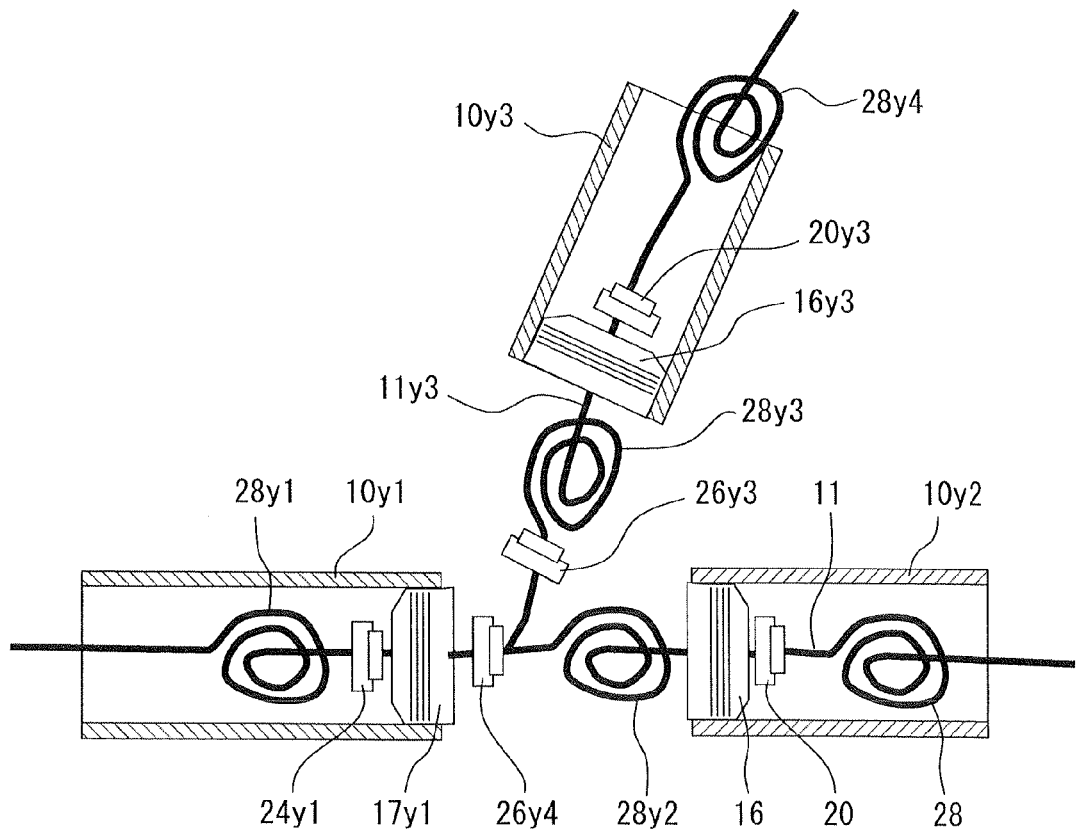
FIG. 19 is a schematic view showing a structure of a three-way connecting node according to the second embodiment.

FIG. 19 is a schematic view showing a structure of a three-way connecting node according to the second embodiment. An outside wiring connector 26*y*3 of a wire 11*y*3 is connected to an outside wiring connector 26y4. A margin portion 28y3, a bushing member 16y3, an inside wiring connector 20y3 and a margin portion 28y4 are provided for the wire 11y3 in this order from an upstream to a downstream side.

Figure 20:
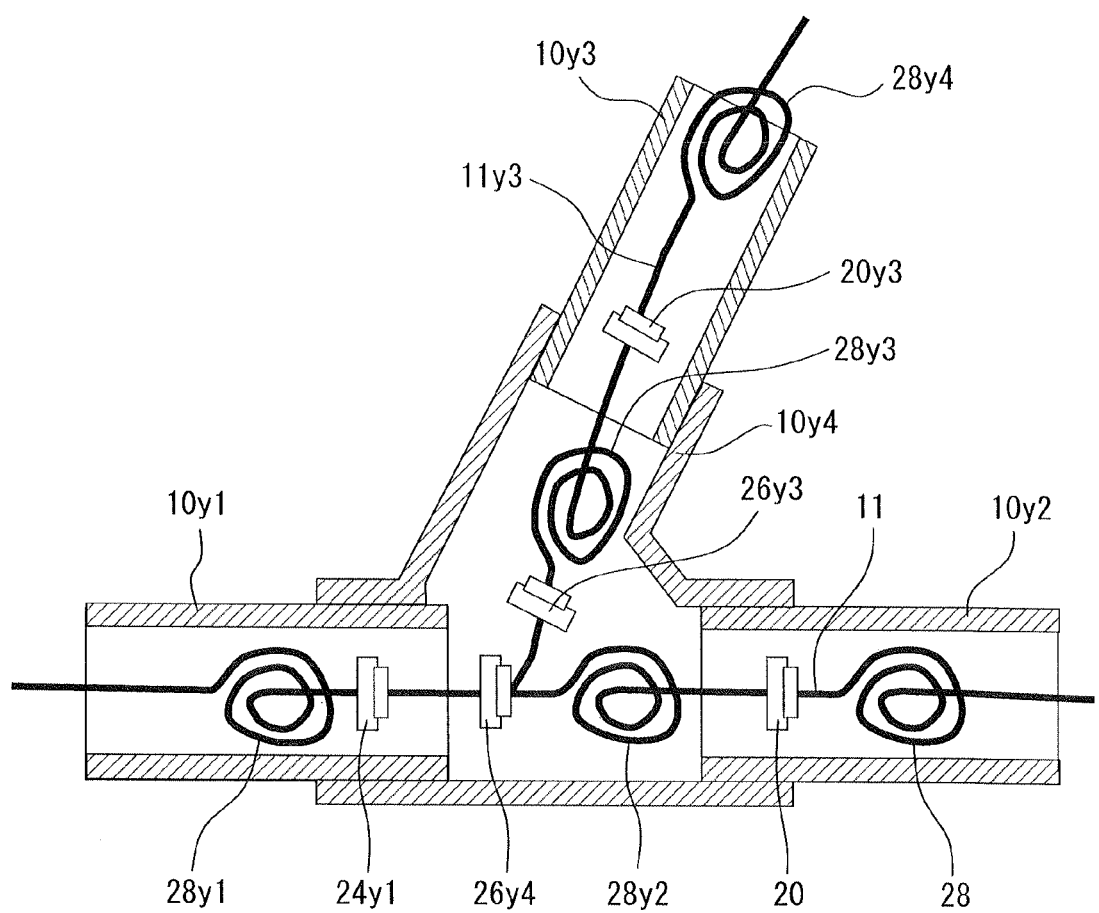
FIG. 20 is a schematic view showing another structure of a three-way connecting node according to the second embodiment.

FIG. 20 is a schematic view showing another structure of three-way connecting node according to the second embodiment. The structure of FIG. 20 is different from that of FIG. 19 in that branched-off pipe member 10y4 of a T-shape is provided at the connecting node. Each of the pipe members 10y1, 10y2 and 10y3 is press inserted into the branched-off pipe member 10y4.

The structure of FIG. 20 is advantageous in improvements of mechanical strength at the connecting node or water-proofing property. The wiring connector 26y4 is composed of a branched-off connector which is specifically designed for branch-off connection, so that the vehicle server easily differentiates the branched off connector 26y4 from the other wiring connectors 24y1, 20, 26y3, 20y3. The branched-off connector 26y4 may have a color different from that of the other connectors.

Figure 21:
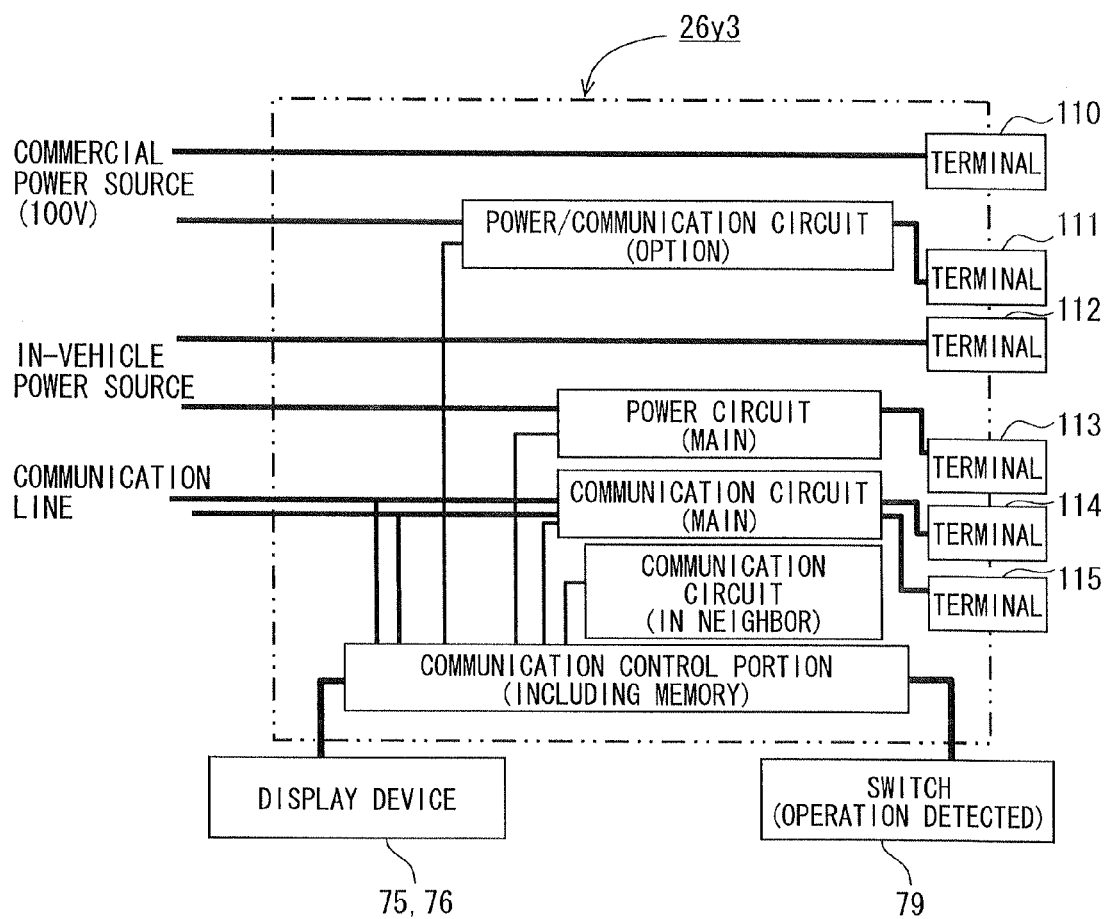
FIG. 21 is a schematic wiring diagram of the wiring connector according to the second embodiment.

FIG. 21 is a schematic wiring diagram of the outside wiring connector 26y3 shown in FIG. 20, according to the second embodiment. The outside wiring connector 26y3 has terminals 110 and 111 for commercial power (100 V), terminals 112 and 113 for an in-vehicle battery (24 V) and terminals 114 and 115 for communication.

When the vehicle is parked in a garage, the commercial power is available at the inside of the vehicle. The commercial power may be used for a battery charger, a cleaner, audio goods, and so on. A minus side of the in-vehicle battery is not grounded to the vehicle body, but connected to a minus line through connectors, which is different from the first embodiment.

Figure 22:
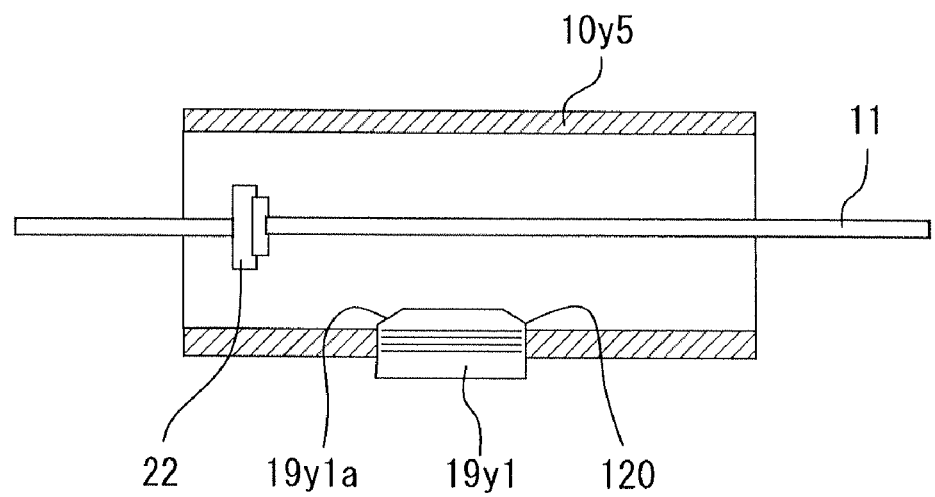
FIG. 22 is a schematic view showing a structure of a side portion of the pipe member.
Figure 23:
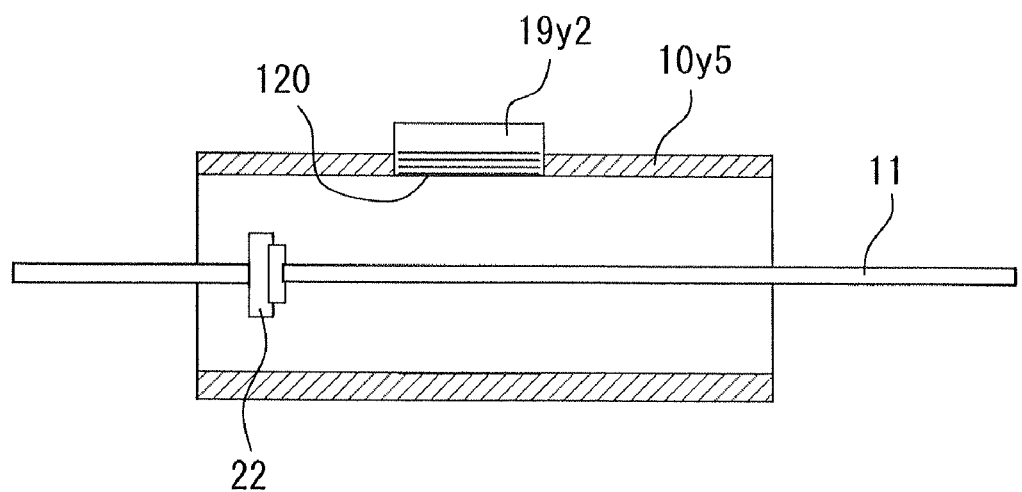
FIG. 23 is a schematic view showing a modified structure of the side portion of the pipe member.

FIGS. 22 and 23 are schematic views showing a structure of a side portion of a pipe member 10y5, at which an opening 120 is formed. A side bushing member 19y1 or 19y2 is attached to the opening 120. An amount of projecting portion of the side bushing member 19y1 or 19y2 into the inside of the pipe member 10y5 is suppressed to a small value, so that such projecting portion may not cause obstruction.

As shown in FIG. 22, when an electrical part is accommodated in the side bushing member 19y1 and thereby a part of the side bushing member is projected into the inside of the pipe member 10y5, chamfered corners 19y1a is formed at the projecting portion of the side bushing member 19y1 so that the projecting portion may not cause obstruction when another wire is inserted into the pipe member 10y5. In case of FIG. 23, the projecting amount of the side bushing member 19y2 is made zero.

Figure 24:
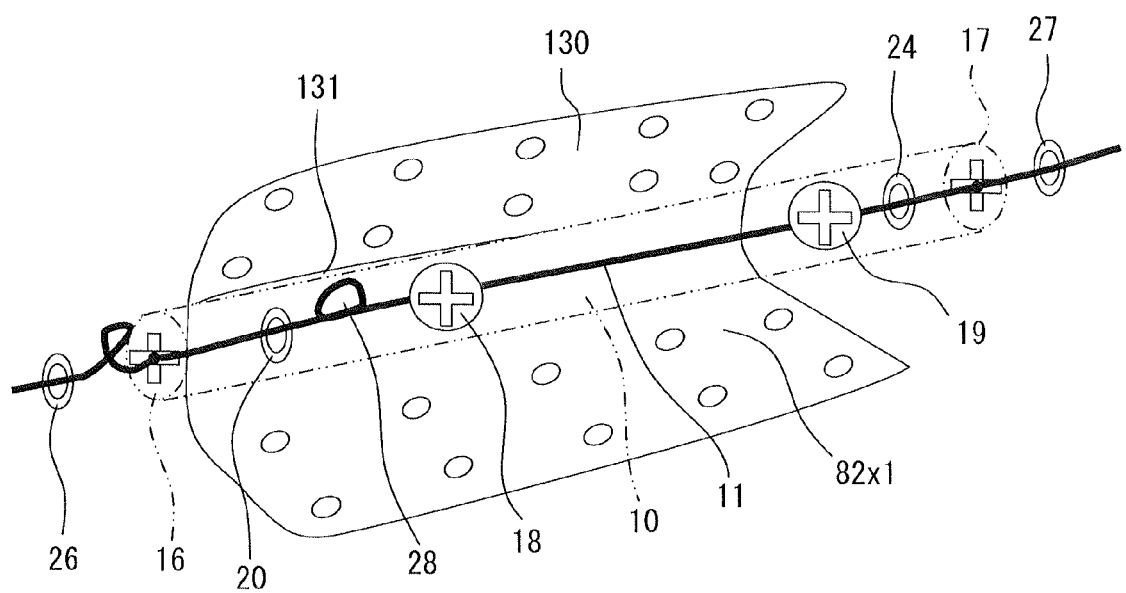
FIG. 24 is a schematic perspective view showing the pipe member fixed in the recessed portion of the vehicle body.

FIG. 24 is a schematic perspective view showing the pipe member 10 fixed in the recessed portion 82x1 formed by a reinforcing member 130 of the vehicle body. In FIG. 24, the pipe member 10 is fixed to the reinforcing member 130 of the vehicle body by a welding portion 131. In a similar manner to the first embodiment, the pipe member 10 may, be fixed to the vehicle body by means of the fixing saddle or the fixing band.

Figure 25:
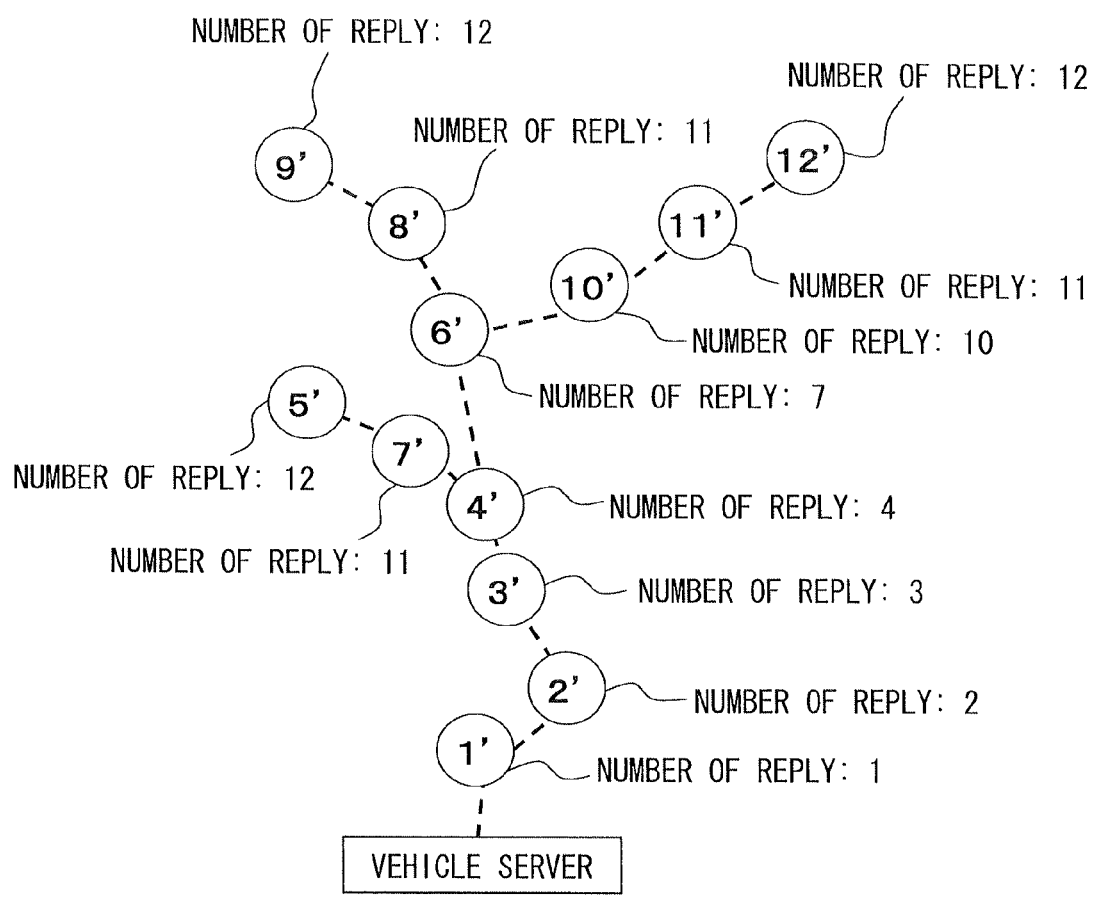
FIG. 25 is a schematic view for deciding the wiring topology according to the second embodiment.

FIG. 25 is a schematic view for deciding the wiring topology in the second embodiment. In this case, there are two connecting nodes. In other words when the communication to the downstream side wiring connectors is prohibited and the number of reply from the respective wiring connectors is investigated, there are two wiring connectors, at which the number of reply is discontinuously changed.

In FIG. 25, since the wiring connectors 5', 9' and 12', each of which has the number of reply (12) equal to the total number (12) of the wiring connectors (1'-12'), the wiring connectors 5', 9' and 12' are decided as the end wiring connectors. In addition, the connector 5' can be decided as the link-up connector based on the ID information from the connector 5'.

Each of FIGS. 26A to 26D is a schematic cross sectional view showing the pipe member 10 and/or the wire 11 fixed to the vehicle body, according to the second embodiment. It is not easy to form a complete closed space only by a bending process. Therefore, in FIGS. 26A to 26D, a sealing process with a sealing member 140, 140x1, and/or 140x2 is additionally carried out to form the closed space.

The sealing member 140, 140x1, and/or 140x2 may be environment friendly resin or regular soldering material, or the sealing process may be welding process. A rain guide 142 is formed at a portion of the vehicle body adjacent to the cover 84, so that rain water may not go into the recessed portion 82.

Figure 26A:
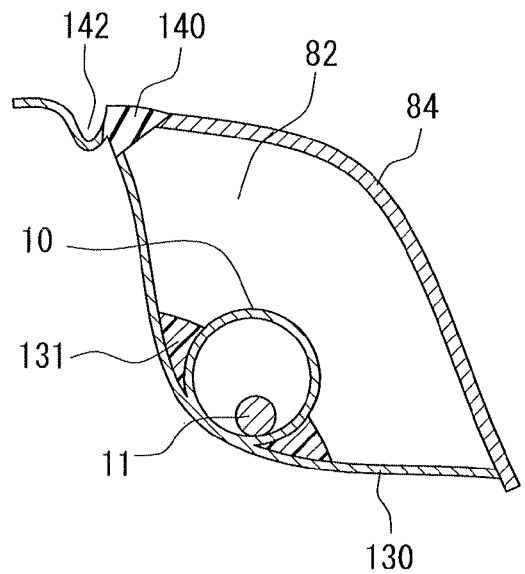
FIGS. 26A to 26D are schematic cross sectional views, each showing the pipe member and/or the wire fixed to the recessed portion of the vehicle body.
Figure 26B:
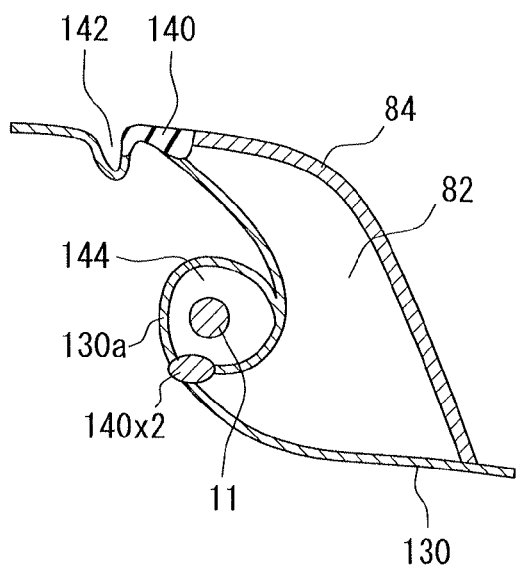
Figure 26C:
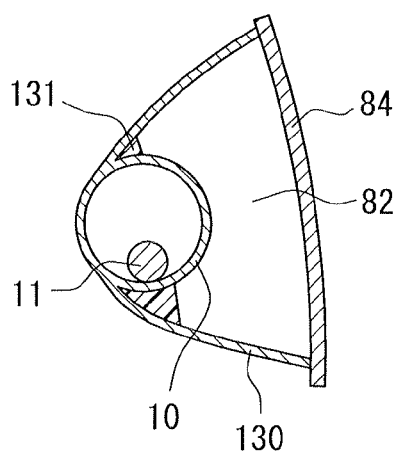
Figure 26D:
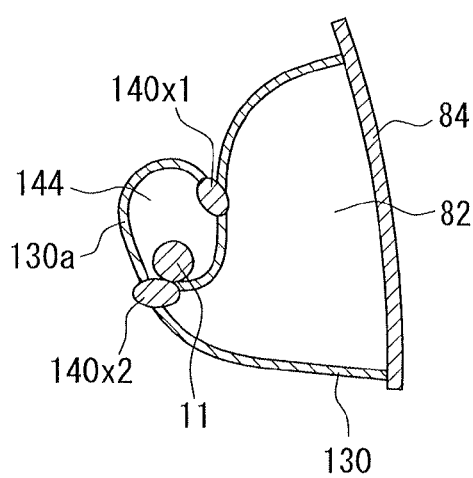

In cases of FIGS. 26A and 26C, the pipe member 10 of the wire unit 15 is accommodated in the recessed portion 82. The pipe member 10 is fixed to the reinforcing member 130 of the vehicle body by adhesive material or welded portion 131. The wire 11 is accommodated in the pipe member 10. In cases of FIGS. 26B and 26D, a closed space 144 is formed by a tubular reinforcing member 130a, and the wire 11 is accommodated in the closed space 144.

The cover 84 is attached to the recessed portion 82, so that the rain water and/or dust may not go into the recessed portion 82. The seal member 140 is formed at a periphery of the cover 84 to prevent water from going into the inside of the recessed portion 82. The cover 84 is detachably attached to the recessed portion 82.

Third Embodiment

A third embodiment will be explained. The same reference numerals of the first and/or second embodiment are used for the same or similar parts and/or portions in the third embodiment.

The third embodiment of the present invention will be explained by comparing the above-explained first and/or second embodiments. According to the third embodiment, the user may attach a retrofitting device (for example, a camera monitoring a circumference of the vehicle, a telecommunication apparatus for communicating with other vehicles, sensors using wireless communication, and so on) at an inside and/or an outside of the vehicle, wherever the user wants to fix it.

For that purpose, a wiring network having wiring connectors is in advance provided in the vehicle body. According to the wiring network of the third embodiment the wire may be separated and/or connected in order to connect the retrofitting device to the wiring network. Therefore, it is not always necessary to use the hard pipe members 10 (as explained with reference to the first embodiment) for the wiring unit in the third embodiment.

Furthermore, it is not always necessary to provide the wiring connectors for each of the wires of the wiring units, even in view of an easier process for connecting the retrofitting device to the wiring network. There may be a wiring portion at which a new wire and/or a new component may be easily connected to the wiring network by use of a well-known terminal, a junction box, or a margin portion of the wire. However, in most cases, it is desirable that such new wire or component may be easily connected by use of the wiring connectors.

Furthermore, according to the third embodiment, a flexible pipe member may be used, or the wiring unit having the wires and the wiring connectors but no pipe members may be used. In the following explanation for the third embodiment, however, the embodiment will be explained as such having the same wiring network to the above first and/or second embodiments.

The ID information is given to the wiring connectors so that the wiring topology can be automatically decided. In addition, a control circuit is provided in the wiring connector. The third embodiment relates to such an embodiment (a control system), according to which a software for a device driver, data communication, data processing and so on may be automatically set-up by use of the wiring connectors, when a camera is connected to the wiring network, wherein the software is suitably applied to the camera and the fixed location of the camera.

Since required functions for the cameras are different from each other depending on the respective fixed locations of the cameras, which are connected as the retrofitting devices, it is necessary to respectively operate the cameras with different conditions. For example, in a case (a first case) of the camera for monitoring the rear side of the vehicle, it is necessary to photograph the rear portion (obliquely lower side) of the vehicle with bright images.

In a case (a second case) of viewing forehand traffic lights and/or traffic signs, it is necessary to photograph images which is in the sky of obliquely upper side of the vehicle front or images overlapping with buildings. Since the above first and second cases are different from each other in the objects to be photographed, it is necessary to differently set up for the brightness of the images, adjustment of the contrast and so on. Furthermore, in the above second case, it is necessary to adjust the brightness in consideration of the backlight, to carry out processes for scaling (zooming) and parallel displacement, and so on.

In a case (a third case) of viewing a blind corner of the sides of the vehicle, or in a case (a fourth case) of viewing left- and right-hand side roads in front to the vehicle, it is also necessary to set up the photographing conditions suitable for the situation, to set up conditions for the image data processing (photographing parameters), and so on.

Therefore, it is desirable to set up the photographing parameters depending on the fixed camera locations for the respective cameras. According to the conventional camera, all of data for various conditions are stored in each of the cameras so that each of them may properly operate at any camera location. Needless to say, if all of data for various conditions are stored in the respective cameras, software necessary for such data may become larger, and thereby a memory device may be inevitably larger. Then, it becomes a problem that a price of the camera system is increased.

According to the third embodiment, therefore, when the user mounts the retrofitting device (such as, the camera, the telecommunication apparatus, and so on) at the outside (or inside) of the vehicle after having purchased the vehicle, the electronic control unit automatically determines the fixing location. Then, the electronic control unit limits the software and/or photographing parameters necessary for the retrofitting device depending on the fixed location. The set up for such software can be done from outside of the retrofitting device. As a result, the memory device is made smaller.

The invention of the third embodiment can be applied not only to the case when an electrical device is retrofitted to the vehicle but also to the case when the electrical device (an in-vehicle component) is mounted in the vehicle as an optional accessory during an assembling process of the vehicle by a car manufacturer. Any electrical devices, other than the camera, may be mounted in the vehicle as the retrofitting device. The structure should not be limited to the vehicle body. However, in the third embodiment, the explanation is made to the case in which the camera is mounted in the vehicle as the retrofitting device.

The wiring structure for the vehicle body of the first and/or second embodiments may be also used for the third embodiment, in which flexibility of locations for fixing the camera is provided. According to the third embodiment, when the in-vehicle components (such as, the camera, the telecommunication apparatus, an auxiliary lighting device, and so on) are mounted in the vehicle, the electronic control unit (the vehicle server) automatically determine the locations where the in-vehicle components are fixed to the vehicle body. The locations for such in-vehicle components may be manually inputted to the vehicle server. The vehicle server provides the software, which is suitably adapted to the location, to the camera.

The vehicle server in advance stores in the memory the data how the wiring is structured, so that the vehicle server is able to automatically decide the wiring topology. Accordingly, data (a firmware, control software, and so on for the retrofitting device) is transmitted from the vehicle server to the retrofitting device through data communication. The transmission method may be cable communication via a conventional communication line, cable communication in which a power supply line is used as a communication line, wireless communication of Bluetooth wireless LAN, or combined communication of the cable and wireless communication.

An embodiment will be explained below as the third embodiment, in which the camera (also referred to as a retrofitting electronic mirror) is retrofitted to the vehicle body. The wiring network is in advance provided in the vehicle body, wherein the wiring network is formed by a plurality of wires connected by wiring connectors.

As already explained in the above first or second embodiment, the wiring topology (that is, a wiring structure indicating where in the vehicle body and what kind of wires are provided) is automatically decided (figured out by the electronic control unit). The vehicle wiring network may be formed in a different manner and location relationship (the topology) of the network may be decided in a different way.

It is, however, important that the electronic control unit (the vehicle server) stores in advance the information where and what kind of wires are provided in the wiring network, or the electronic control unit can determine where the retrofitting device is located.

According to the third embodiment, ID element is attached to the wiring connector and the vehicle server reads out the information contained in the ID element, so that the wiring system for the power-supply and data communication is so formed that the electronic control unit automatically decides the wiring structure.

As a result, the vehicle server can get information relating to the network of the ID information of the wiring connectors as well as information of three dimensional locations of the wiring; connectors. The information of the three dimensional locations is used by the vehicle server, when the vehicle server determines the location of the retrofitting device based on the location information of the wiring connectors and the vehicle server sends the information related to the location to the retrofitting device.

Each of the wiring connectors has a function for communicating with the vehicle server. Data for identifying whether it is an upstream side (vehicle server side) connector or a downstream side (client side) connector are given to the wiring connector (more exactly, to the respective connector parts). The vehicle server outputs a command signal to the wiring connectors to send back reply and receives the replies from the wiring connectors, so as to investigate the wiring structure.

The vehicle server has a function for searching a pair of connector parts, which are coupled together, and for storing in the memory information of pairs of the connector parts. Based on the information of pair of the connector parts, the vehicle server detects whether the pair of the connector parts is changed or whether anything else other than the wire is connected to the wiring connector.

According to the third embodiment, when the vehicle server detects that anything else (the in-vehicle component) other than the wire is connected to the wiring network, the vehicle server collects information for the location of such in-vehicle component, kinds of the in-vehicle component and so on through the communication between the vehicle server and the newly-connected in-vehicle component.

The vehicle server determines whether it is necessary or not to install different software in the newly-connected in-vehicle component. If necessary, the vehicle server investigates whether the vehicle server has such software in its memory or not. In the case that the vehicle server has such software, the vehicle server designates the necessary software and writes the software in a memory device of the newly-connected in-vehicle component. In addition, the vehicle server sets up a device driver for controlling the newly connected in-vehicle component.

When it is necessary for the newly connected in-vehicle component to modify the firmware, the vehicle server updates the firmware of the connected in-vehicle component. In the case that the vehicle server does not have the necessary software for the newly connected in-vehicle component, the vehicle server connects itself to an external server to download the necessary software. Then, the vehicle server set up the software, so that the camera may move in a manner depending on the location where it is fixed to the vehicle body.

Alternatively, the vehicle server may receive the necessary software from the other vehicle via wireless communication and store it in its memory, and then the vehicle server may install the software in the memory of the retrofitting device.

The connector part on the vehicle server side, that is, the upstream side connector part forming the pair of the connector parts, has a function to communicate with the vehicle server.

The vehicle server receives the information from the wiring connector having ID information, for which the start of communication is set. The vehicle server collects ID information of the wiring connectors, which are located at upstream side (on the side closer to the vehicle server) of the wiring connector, for which the vehicle server received the ID information. Then, the wiring connector, for which the start of communication is set, is changed. Based on the differences of number of reply for the ID information, the wiring topology is decided, as in the same manner to that of the first embodiment.

As already explained, the vehicle server differentiates the link-up connectors provided in the link-up wires from the wiring connectors provided in the main wiring lines, based on the characteristic data thereof (that is, the data attached to the respective connectors for identifying the link-up wires or main wiring lines) The ID information of the downstream side connector part, which is coupled to the upstream side connector part, is obtained by the wireless communication.

So long as a distance between the upstream side and downstream side connector parts is within a predetermined range, the communication between them can be done by a wireless communication ID tag of a passive type, even when the upstream side and the downstream side connector parts are not coupled to each other, in other words, even when the electrical power is not supplied to the downstream side connector part. Namely, communication power is supplied from the upstream side connector part to the downstream side connector part by the wireless communication, and information (for example, a degree of damage) can be collected.

The wireless communication ID tag of the passive type means that an electrical component (such as, the downstream side connector part) does not have its own electrical power source, such as a battery, but creates operating power energy from electromagnetic wave from another electrical component (such as, the upstream side connector part) sending the wave, and sends back information to the other electrical component sending the wave.

The vehicle server investigates the situation (degree of damage) of the downstream side connector part. When it is possible to control the downstream side connector part, a different wiring connector which is located within the predetermined range to that downstream side connector part may communicate with such connector part by wireless communication to carry out remote control operation to the downstream side connector part.

By use of a well known technology, an ID chip may be attached to each of the connector parts so that the ID information contained in the ID chips can be read out by the vehicle LAN. The technology for investigating and deciding the wiring topology is basically explained in the above first embodiment.

In case of fixing the camera to a front and/or rear side of the vehicle body, the camera is mostly fixed to a convex portion in order to achieve a wide view. When the camera is fixed to the front side of the vehicle, the camera may be fixed to a position above headlights or at an upper side of a windshield. When the camera is fixed to the rear side of the vehicle, the camera may be fixed at a position close to a roof or adjacent to a rear lamp.

The above position is almost the same to that explained for the first embodiment with reference to FIG. 1. The camera may be embedded in the bumper. However, the camera may be heavily damaged in case of an accident.

Wherever the camera may be provided, it is necessary to supply electrical power to the power and to send back the photographed images to a display device. It is desirable to transmit the photographed images at a high speed, when the photographed images are used for assisting the vehicle driver in driving the vehicle, because it may be dangerous if the photographed images are sent at a low speed.

It is convenient if the communication line is already provided in the vehicle, through which the electrical power is supplied to the camera and the photographed images are sent back to the display device. It is annoying to process a wire harness or to carry out a soldering process, in order to connect the camera to the vehicle server. It is desirable to connect the camera to the wiring network (to the vehicle server) by a simple operation, such as just de-coupling and/or coupling the wiring connectors.

As a result of considering the above points, the wiring connectors are used in the above first and/or second embodiments, more exactly, the wiring connectors are accommodated in a space of the vehicle body, which has not been effectively used so far. Any wiring structure may be applied to the third embodiment. However, the third embodiment will be explained as such an embodiment having the same wiring structure to that of the first or second embodiment.

In the first embodiment shown in FIG. 11, the vehicle server and the battery 1 (FIG. 1) are designated by the battery-server module 60. The electrical power source and the communication controller are included in the battery-server module 60 (which is arranged in the hood of the vehicle front portion) as one of components thereof. In the following third embodiment, the electrical power source and the communication controller are made as the basic point for the wiring structure.

The wiring connector has a communication control portion for controlling an operation of the wiring connector. A memory device may be included in the communication control portion, which is communicated with the vehicle server so that the operation of the wiring connector is controlled. When the communication between the wiring connector and the vehicle server is shut down, the vehicle server tries to communicate with the wiring connector (for example, the downstream side connector part) via another wiring connector which is located adjacent to the first-mentioned wiring connector.

In case of the plug-in type hybrid car, the electrical power is supplied from the commercial power to the battery via the power supply line. The power supply line may be also used as communication line. In such a case, the vehicle server may process the information to be transmitted via the power supply line, so that the information may be transmitted through the vehicle wiring network.

The vehicle server further controls a switching operation for using direct current or alternating current in order to supply the electrical power to the wires of the wiring network. The vehicle server sends a command signal to the wiring connectors so as to control ON-OFF operation for the power supply, so that electrical power beyond a permissible value may not be supplied to the in-vehicle components. The wiring connectors connected to the in-vehicle components, which are not required to be operated, are controlled to be in OFF condition, so that no electrical power may be supplied to such in-vehicle components.

It may be much safer, if the in-vehicle component could detect whether the electrical power currently supplied to the component is direct current or alternating current, and if the in-vehicle component could automatically convert the electrical power into either direct or alternating current, with which the in-vehicle component can be operated. However, such a function costs a lot and increases weight. Therefore, such a function may not be practical. It is more effective, when the vehicle server controls the electrical power supply in block.

The wiring connector may have a switch for detecting whether the pair of connector parts are coupled with or decoupled from each other. The switch sends a signal to the vehicle server when the connector parts are separated from each other. For example, a pushing portion for de-coupling the connector parts may be also used as the switch, so that the vehicle server may confirm that the connector parts are being decoupled and decide to stop the electrical power supply to such wiring connector.

Figure 27:
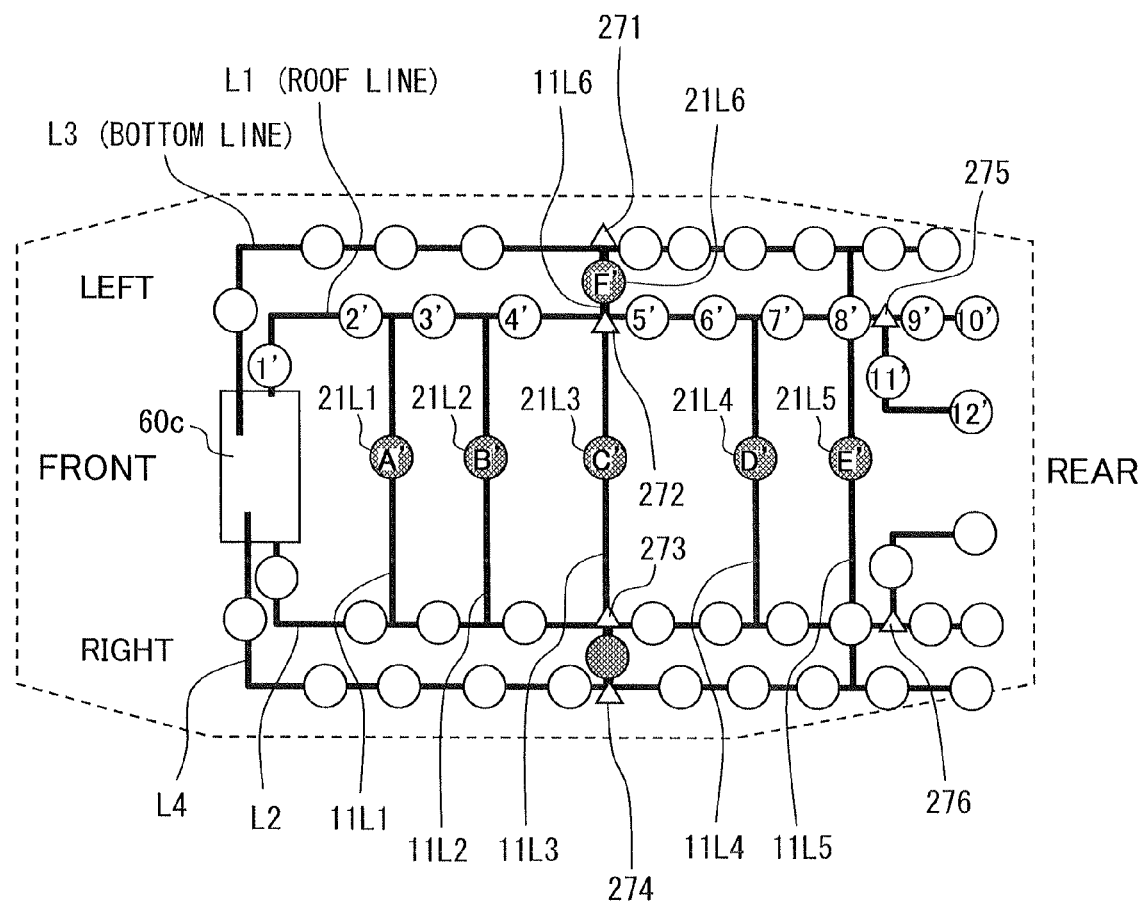
FIG. 27 is a schematic view showing a vehicle network, according to a third embodiment, before the retrofitting device is not yet connected to the vehicle network.

FIG. 27 is a schematic view showing a vehicle network, wherein an in-vehicle component (to be mounted in the vehicle afterwards) is not yet connected to the vehicle network. In FIG. 27, a black circle designates a link-up connector. A triangle shape (271, 272, 273, 274, 275, and 276) designates a router for in-vehicle components corresponding to IP network.

IP address means an identifier which is used in TCP/IP network to identify an address or a sender for a packet telecommunication. When the vehicle server responds to the IP address, it becomes easier to send data meeting specific conditions to a target component, and it becomes possible to adjust even when amount of data is increased in the wiring lines. It is also possible, by packet filtering, to prevent data not meeting the specific conditions from passing through.

In FIG. 27, four main wiring lines are indicated, that are the left- and right-hand side bottom lines L3 and L4, and the left- and right-hand side roof lines L1 and L2.

Each of the four main wiring lines is identified in a network controller 60c of the vehicle server (also referred to as the vehicle server 60c), when the wiring lines are connected to the vehicle server 60c. During the wiring work, link-up connectors of link-up lines are kept in a non-conductive condition. According to the embodiment, vehicle server can designate the link-up connector to control the conductive and non-conductive condition of such designated connector.

A method for deciding the wiring topology is similar to that for the first and/or second embodiment. The method for deciding the wiring topology will be briefly explained.

The vehicle server sets all of the link-up connectors to the non-conductive condition and collects ID information from all of them.

The ID information of all of the link-up connectors is collected by changing the main wiring lines and ID information of the connector part coupled to the link-up connector (at the downstream side) is investigated through contact-less communication. ID information of an end link-up connector is decided for each of the main wiring lines.

Then, the vehicle server designates one of the main wiring lines, and sets the other main wiring lines so that information may not be sent to those non-designated main wiring lines. The vehicle server outputs a command signal to all of the wiring connectors of the designated main wiring line so that each of the wiring connectors of the designated main wiring line sends reply to the vehicle server.

The vehicle server receives ID information of the wiring connectors within a predetermined time and stores them in the memory device. The vehicle server randomly selects one of the wiring connectors, which sent replies to the vehicle server, and outputs a command signal to such selected wiring connector so that the wiring connector may not send a reply thereafter. Then, the vehicle server outputs a further command signal to the wiring connectors to send back again their ID information. The vehicle server receives the ID information from the wiring connectors within the predetermined time and stores them in the memory. The above process is repeated by several times until the vehicle server confirms that no reply for the ID information is made from the wiring connectors. As above, the vehicle server collects the ID information from all of the wiring connectors provided in the designated main wiring line.

The above process is carried out for all of the main wiring lines to collect the ID information from all of the wiring connectors of the respective main wiring lines. As above, the vehicle server collects the information relating to which main wiring line has which wiring connectors and which wiring connector has which ID information.

Figure 28A:
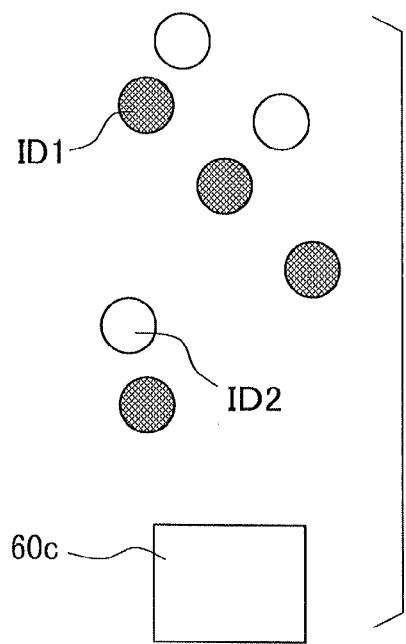
FIGS. 28A to 28C are schematic views showing an initial stage for deciding the order of the wiring connectors to the vehicle server, wherein the location of the vehicle server is not yet fixed.
Figure 28B:
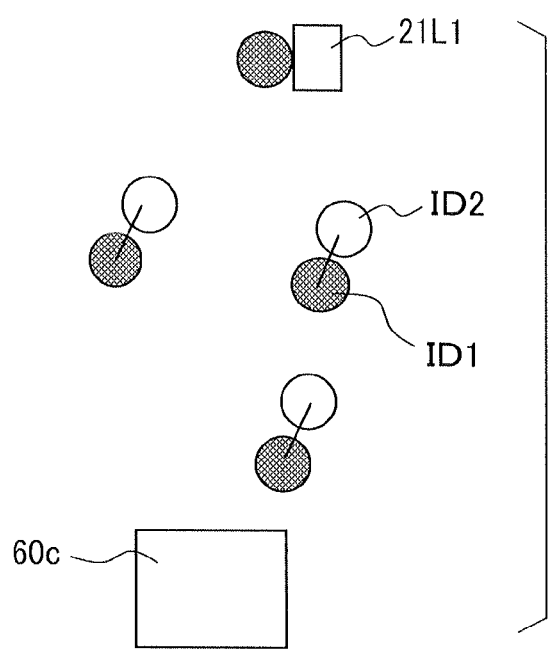
Figure 28C:
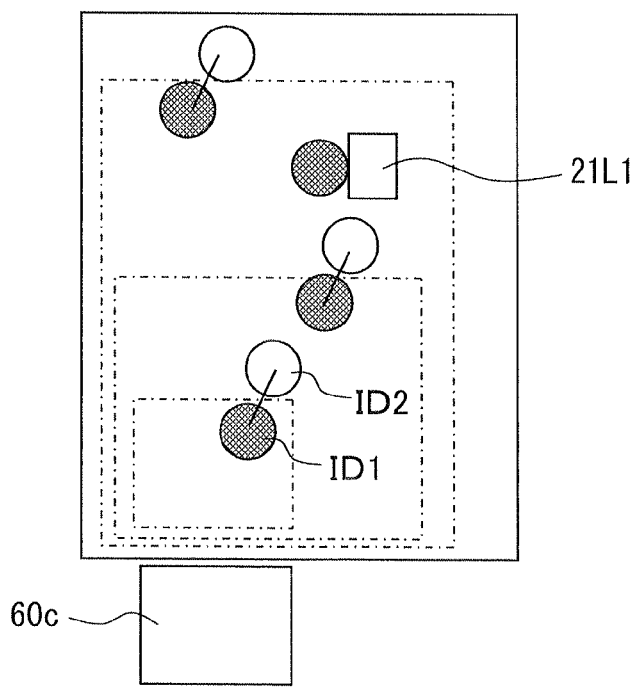

Then, the vehicle server carries out a process, according to which the wiring connectors are lined up, in other words, an order of ranking to the vehicle server for the respective wiring connectors will be decided. At first, one of the main wiring lines is designated. The vehicle server stores in the memory a number of the wiring connectors provided in the designated main wiring line. FIGS. 28A to 28C are schematic views showing an initial stage for deciding the order of the wiring connectors to the vehicle server, wherein the location of the vehicle server is not yet fixed.

As shown in FIG. 28A, at the initial stage, the ID information of the wiring connectors (ID information for each connector part) are randomly arranged when viewed from the vehicle server. The vehicle server designates ID information for one of the connector parts and searches ID information of such connector part neighboring to (coupled to) the designated connector part.

As shown in FIG. 28B, when the connector part ID1 is connected to the connector part ID2, the information showing that the connector part ID2 is connected to the connector part ID1 is sent from the connector part ID1 to the vehicle server. In a similar manner, the information showing that the connector part ID1 is connected to the connector part ID2 is sent from the connector part ID2 to the vehicle server. The connector part closer to the vehicle server is called as an upstream side connector part, while the connector part far from the vehicle server is called as a downstream side connector part.

As shown in FIG. 28C, the vehicle server designates one of the wiring connectors (one pair of the connector parts) and outputs a command signal to the designated wiring connector so that the designated wiring connector stops the communication to the downstream side connector part. Then, the vehicle server outputs a command signal to all of the wiring connectors to send back ID information to the vehicle server. In this case, the vehicle server also outputs the command signal to the link-up connector 21L1 to send back its ID information. The other wiring connectors are designated one by one in a sequential order to repeat the above process, so that the ID information are collected from all of the wiring connectors of the designated main wiring line. The other main wiring lines are likewise designated sequentially so that ID information from all of the wiring connectors of all of the main wiring lines are collected.

The vehicle server figures out the number of replies from each of the wiring connectors, wherein the reply is sent to the vehicle server in the condition that the communication to the downstream side is prohibited. Then, the list for ID information is so changed that the wiring connector having a smaller number of replies is regarded as such wiring connector closer to the vehicle server. When there is no connecting node in the wiring system, the order of the wiring connectors to the vehicle server is decided by the above process.

In the case that there is a connecting node, it is necessary to fix the branched-off condition. As in the same manner to the above first and/or second embodiments, it is possible to fix the branched-off condition by checking which of the ID information is not sent back to the vehicle server when the communication to the downstream side wiring connector(s) is stopped.

In other words the branched-off condition can be investigated by checking the number of replies at the respective wiring connectors, at which the number of replies has discontinuity. According to the above process, the ID information for the wiring connectors of the one main line as well as the locations of the ink-up connectors (the orders from the vehicle server) are decided. In the same manner to the above, the ID information for the wiring connectors as well as the locations of the link-up connectors are decided for the other main wiring lines.

Then, the vehicle server investigates which of the wiring connectors is connected in which portion of the vehicle body. The locations of the wiring connectors are decided for one of the main wiring lines.

The vehicle server reads out data for a wiring pattern of the vehicle wiring network. The data for the wiring pattern includes the information for the locations where the link-up connections are arranged.

FIG. 27 schematically shows the wiring network when viewed from above the vehicle. The four main wiring lines L1 to L4, which extend from the network controller 60c of the vehicle server provided at the front side of the vehicle, are formed by use of the structure of the reinforcing members, which are provided at an upper portion and a lower portion of the vehicle body and extend along a profile of the vehicle body.

According to the present embodiment, the link-up connectors 21L1 to 21L5 (also designated by letters of A' to E') are provided at the link-up wiring lines relaying the main wiring lines L1 and L2, which are provided at the upper portion of the profile of the vehicle body.

The link-up lines may be also provided at the lower portion of the profile of the vehicle body. Since the ID information of the link-up connectors are already collected in the above process, it is not necessary to collect the ID information of the link-up connectors, when the in-vehicle component is mounted in the vehicle afterwards.

According to the present embodiment, the information for the locations of the link-up connectors are already stored in the memory of the vehicle server. Those are six link-up connectors, namely the link-up connector (A') provided at the hood of the vehicle, the link-up connectors (B'), (C') and (D') provided at the roof of the vehicle, and the link-up connector (E') provided at a trunk of the vehicle. The vehicle server has data for a three dimensional feature size of the vehicle body.

The vehicle server also has information for the reinforcing members, that is, where the reinforcing members are provided, in which reinforcing members the link-up connectors are provided, and so on. Namely, the vehicle server stores the information in the memory that the link-up connectors are provided on the hood (A'), at a front side of the roof (B'), at a middle portion of the roof (C'), at a rear side of the roof (D'), on the trunk (E'), and at left-hand side (F') when viewed from the front of the vehicle. The vehicle server decides rough locations of the respective link-up connectors based on the above location data, as below.

The wire for the link-up connector A' (=21L1) is connected to the connecting node between the wiring connectors 2' and 3', wherein the link-up connector A' is provided on the hood. Therefore, the wiring connectors 2' and 3' are estimated that they are located at a portion close to a front pillar of the vehicle body. The wiring connector 4' is arranged between the connecting nodes of the wires for the link-up connectors B' (=21L2) and C' (=21L3). Therefore, the wiring connector 4' can be estimated that it is located at the front side of the roof.

The wiring connectors 5' and 6' are arranged between the connecting nodes of the wires for the link-up connectors C' (=21L3) and D' (=21L4). Therefore, the wiring connectors 5' and 6' are estimated that they are located at the rear side of the roof. The wiring connectors 7' and 8' are arranged between the connecting nodes of the wires for the link-up connectors D' (=21L4) and E' (=21L5). Therefore, the wiring connectors 7' and 8' are estimated that they are located at a portion close to a rear pillar of the vehicle body.

When the rough locations of the link-up connectors are decided as above, the information of such locations are stored in the memory of the vehicle server. According to the above process, since it is not necessary to decide in advance the ID information for the wiring connectors, the control for a large number of the wiring connectors can be done in a shorter time period.

Even when the in-vehicle component (the retrofitting device) is mounted in the vehicle afterwards, the ID information for such in-vehicle component can be collected and registered in the vehicle server after having fixed the in-vehicle component, as in the same manner to the method for collecting the ID information of the wiring connectors. It is, therefore, easy to register the ID information of the in-vehicle component to the vehicle server.

In addition, even when any failure occurs, it is possible to quickly determine where the failure has occurred. When disconnection occurs in the wiring connector, which is next to the wiring connector operating in good order, it is possible to confirm, by air, behavior of the wiring connector in malfunction.

In the case that the in-vehicle component (the retrofitting device), such as a camera or a telecommunication apparatus having high directivity, is mounted in the vehicle, a process for moving such in-vehicle component depends on the location where it is fixed to the vehicle body. It is, therefore, important to quickly collect the information of the location for the in-vehicle component, so that the vehicle server decides a control program for correctly moving the in-vehicle component. In case of the in-vehicle component having the high directivity, since a program (a control software) for controlling the movements in those directions which are not required is not necessary, it is advantageous that a memory capacity can be reduced.

When the wiring topology is decided, addition of the wiring connectors, disassembly of the wiring connectors, mounting of the in-vehicle component (the retrofitting device), and detachment of the in-vehicle component are carried out in the following manner. Before touching the wiring connectors, the user inputs the vehicle server that he starts work of mounting the in-vehicle component. In this case, an ignition switch is turned off to stop a main power supply. A power supply for the communication is continued.

When a predetermined operation is carried out in a monitoring mode, a monitoring portion of the vehicle server is activated to start monitoring of the network. The vehicle server requests the user to input the information for the process (the work) to be done.

In case of mounting the in-vehicle component in the vehicle afterwards, the user selects "addition of the in-vehicle component". When the user designates a position where the in-vehicle component will be mounted, the cover for the recessed portion of the vehicle body (in which the in-vehicle component will be accommodated) is unlocked so that an operation for changing the wiring connectors may be carried out.

When one of the wiring connectors is de-coupled by the user, the ID information of the de-coupled wiring connectors (the ID information of the respective separated connector parts) are sent to the vehicle server. The vehicle server stores in the memory the information which of the wiring connectors are de-coupled.

The vehicle server responds to the de-coupled wiring connectors and stops the power supply as well as the communication to the wiring connectors. The LED may be emitted so that the user may confirm the stop of the power supply to the wiring connectors.

When the in-vehicle component is connected to the wiring connectors and a power switch of the in-vehicle component is turned on, the vehicle server starts the power supply to the wiring connectors. Then, information that the in-vehicle component is connected to the wiring connectors is sent to the vehicle server.

The vehicle server receives the ID information of a connector (or connector parts) of the in-vehicle component or the ID information of the in-vehicle component itself and stores in the memory the information what kind of in-vehicle component is connected to the wiring connectors. The in-vehicle component to be mounted afterwards in the vehicle has the information relating to the model number, the manufacturer, function, specifications for communication, and major command set. The above information is sent to the vehicle server. The major command set includes a signal, according to which the in-vehicle component carries out a designated behavior (for example, sending a reply to information from outside) upon receiving a command signal from the outside.

When the upstream side connector part detects that the downstream side connector part (which is a counterpart of the pair of the connector parts) is de-coupled from the upstream side connector part, the ID information of such wiring connector is sent to the vehicle server.

In addition, when any one of the in-vehicle components (including the wiring connectors) having new ID information is connected to the wiring connector, such new ID information is sent to the vehicle server, so that the ID information of such newly connected wiring connector or in-vehicle component is stored in the memory of the vehicle server.

The ID information is also given to the connector (or the connector parts) of the in-vehicle component (the retrofitting device) and such ID information is sent to the vehicle server. When an external hardware device or the retrofitting device is connected to the vehicle wiring network and carries out the communication with the vehicle server, the vehicle server figures out a communication path between the vehicle server and the external hardware device or the retrofitting device.

For that purpose, the vehicle server controls the vehicle wiring network and the in-vehicle components (the retrofitting device) connected to the vehicle wiring network. More exactly, the vehicle server stores in the memory a location map for the ID information of the wiring connectors, wherein the location map shows where and what kinds wiring is provided. And whenever, the wiring condition for the wiring connectors is changed, the location map for the ID information of the wiring connectors is updated.

When the wiring connector is de-coupled and the in-vehicle component (the retrofitting device) is connected to the de-coupled wiring connector, such a change is stored in the memory of the vehicle server. ID information may be attached to the cover member for the reinforcing member according to need, and the vehicle server may detect whether the cover member is detached from the vehicle body or not. Each of the wiring connectors has the following functions:

(1) the wiring connector receives the command signal from the vehicle server;

(2) the wiring connector sends back its ID information to the vehicle server;

(3) the (upstream side) connector part reads ID information of the neighboring (downstream side) connector part and sends such ID information to the vehicle server;

(4) the wiring connector controls the electrical power supply to the upstream or downstream side of the specific wiring connector, the electrical power supply at the abnormal condition, or change of alternating current and direct current;

(5) the wiring connector stops the communication to the downstream side wiring connector (in case of the abnormal condition, to the upstream side wiring connector); and (6) the wiring connector sends the information of the status quo of the wiring connector to the vehicle server.

Figure 29:
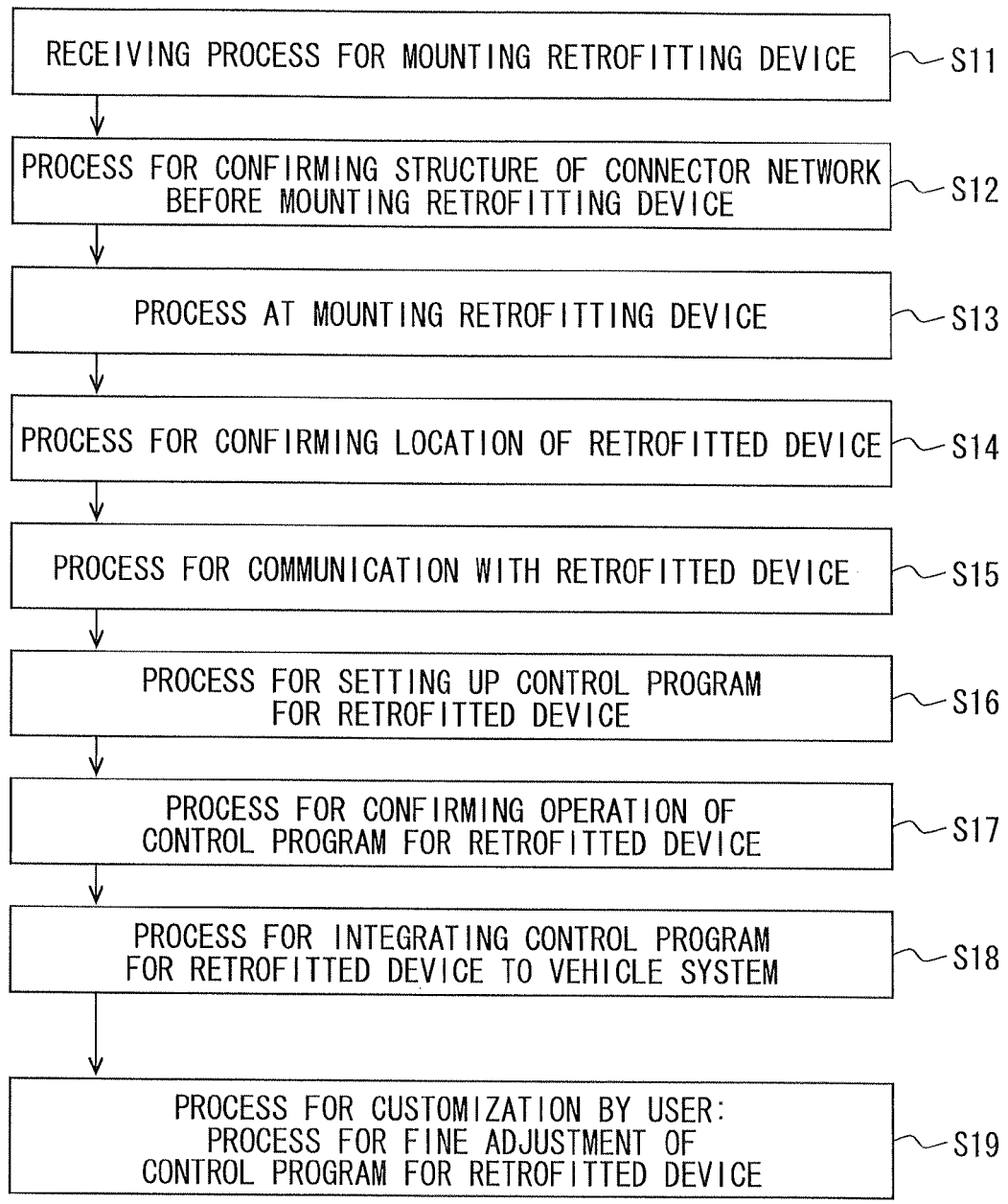
FIG. 29 is a process chart showing steps for mounting the monitoring camera (for monitoring the outside of the vehicle) in the recessed portion of the vehicle according to the third embodiment.

FIG. 29 shows steps for mounting the monitoring camera (the retrofitting device for monitoring the outside of the vehicle) in the recessed portion of the vehicle body according to the third embodiment. An example for mounting the monitoring camera in the recessed portion will be explained with reference to FIG. 29.

At a step S11 of FIG. 29, a receiving process is carried out for mounting the retrofitting in-vehicle device. Namely, the user inputs the vehicle server that he is going to mount the in-vehicle device, before starting the retrofitting operation. The vehicle server monitors setup time and the start of retrofitting operation.

At a step S12, the vehicle server confirms the structure of the connector network before mounting the retrofitting device. For that purpose, the vehicle server reads out the condition of the vehicle wiring structure (that is, the connector network) before mounting the retrofitting device, and compares it with the current condition thereof. In the case that the above process of confirming the structure of the connector network on a routine basis, the process is not necessary at the step S12. When there is a problem in the connector network, a caution mark is displayed to inform the user to stop the mounting of the retrofitting device.

At a step S13, a process during the mounting operation of the retrofitting device is carried out. Namely, the vehicle server monitors whether the cover is removed from the vehicle body, the wiring is changed, and so on. When the user starts the mounting operation, the vehicle server determines the wiring connector which is operated by the user and stops the electrical power supply and the communication to the wiring line for the wiring connector. In the case that there is another in-vehicle device at a downstream side of the wiring line, and the in-vehicle device is in its operation, the vehicle server stores in the memory the information for discontinuation. A process discontinued above for the other in-vehicle device will be started again after the mounting operation for the retrofitting device has been completed.

Alternatively, a router may be provided in the wiring line so that the electrical power supply and the communication are stopped only for the wiring line, to which the retrofitting device is connected. As a result, it is not necessary to stop the electrical power supply and the communication to the other wiring lines, for which the other in-vehicle devices are connected and in operation. Alternatively, the vehicle server continues the electrical power supply and the communication to the other wiring lines, for which the other in-vehicle devices are connected and in operation, via link-up lines, so that the process for mounting the retrofitting device is carried out.

For example, when the retrofitting device is connected to the wire adjacent to the wiring connectors 3' and 4', the operation for the wiring, connectors 3' and 4' (for example, the power supply via the wiring connectors 3' and 4') are stopped. The electrical power supply and the communication to the in-vehicle devices, which are located at the downstream side of the wiring connector 5', are carried out via the router 273 of the right-hand side wiring line L2, the link-up connector 21L3, and the router 272 of the left-hand side wiring line L1.

At a step S14, the vehicle server confirms the location of the retrofitting device. When the user has changed the wiring condition and mounted the retrofitting device in the vehicle, the request is made for supplying the electrical power to the retrofitting device. Then, the vehicle server confirms the change of the wiring condition (that is, the connector network). The vehicle server confirms the ID information of the wiring connector to which the retrofitting device is connected, the ID information of the retrofitting device, and/or the ID information of the connector of the retrofitting device.

When the vehicle server can not confirm the change of the ID information of the wiring connector, the vehicle server informs the user to confirm whether the connection between the wiring connector and the retrofitting device is surely carried out or not. The vehicle server determines the location of the retrofitting device by the ID information of the wiring connector to which the retrofitting device is connected.

At a step S15, the vehicle server starts the communication with the retrofitting device. Namely, when the vehicle server confirms the connection of the wiring connector to the retrofitting device, the vehicle server starts the communication with the retrofitting device to confirm the manufacturer, the model number and so on.

When the vehicle server confirms the detailed information of the retrofitting device, the vehicle server decides software to be used by the retrofitting device. When the vehicle server does not have such software (program) for the retrofitting device, the vehicle server prepares the software by downloading it from an external sever or a maker of such retrofitting device.

At a step S16, the vehicle server sets up the program for the retrofitting device. When the vehicle server determines the location of the retrofitting device, the vehicle server selects the software (control program) necessary for such location. After the vehicle server has selected the necessary software, the vehicle server registers the software in the memory device of the retrofitting device and sets up in order not to perform unnecessary functions. The vehicle server stores in its memory the information relating to the software (control program) registered in the retrofitting device.

At a step S17, the vehicle server confirms the operation of the control program for the retrofitting device. Namely, the vehicle server confirms whether the retrofitting device is correctly operated according to the control program. More exactly, the vehicle server sends to the retrofitting device a command signal by use of a test program, and confirms whether a response is correctly returned or not. In the case that there are multiple retrofitting devices, such process is repeated for the respective devices.

At a step S18, the vehicle server carries out integration of the control program registered in the retrofitting device to a vehicle system. Namely, after the above test for the correct operation is ended, the vehicle server sets up for HMI (Human Machine Interface) for operating the retrofitting device. In other words, the vehicle server allocates operating commands to a HMI controller in order that the user may easily operate the retrofitting device. In this set-up process, location of an operating device, location of a control display, a display size, a number of displays and so on are taken into consideration.

Furthermore, the vehicle server sets up a content of operation selected by the user, a position of display its information, a size of the information displayed and so on. In this set-up process, the vehicle server takes it into consideration that the size of the information displayed and so on may not give uncomfortable feeling to the user depending on the location of the retrofitting device.

The vehicle server has multiple standard user-interfaces stored in the memory thereof, so that the vehicle server sets up HMI depending on a model of the vehicle, equipments of the vehicle (including an operating device), user's characteristics (such as, body type, eyesight, brute strength, and so on). As above, the registration and set-up of the retrofitting device is completed by the vehicle server.

At a step S19, a process for customization (fine adjustment of the control program for the retrofitting device) is carried out by the user. In this process, the user sets up easier operation, adjustment of displaying position, the size of information displayed, and so on.

When the user has finished its set-up as desired, the vehicle server stores the set-up information in its memory, so that the set-up condition is changed to the condition decided by the user. In the case that there are multiple users, the vehicle server may identify the use in the vehicle so that the set-up condition for such user is used.

Figure 30:
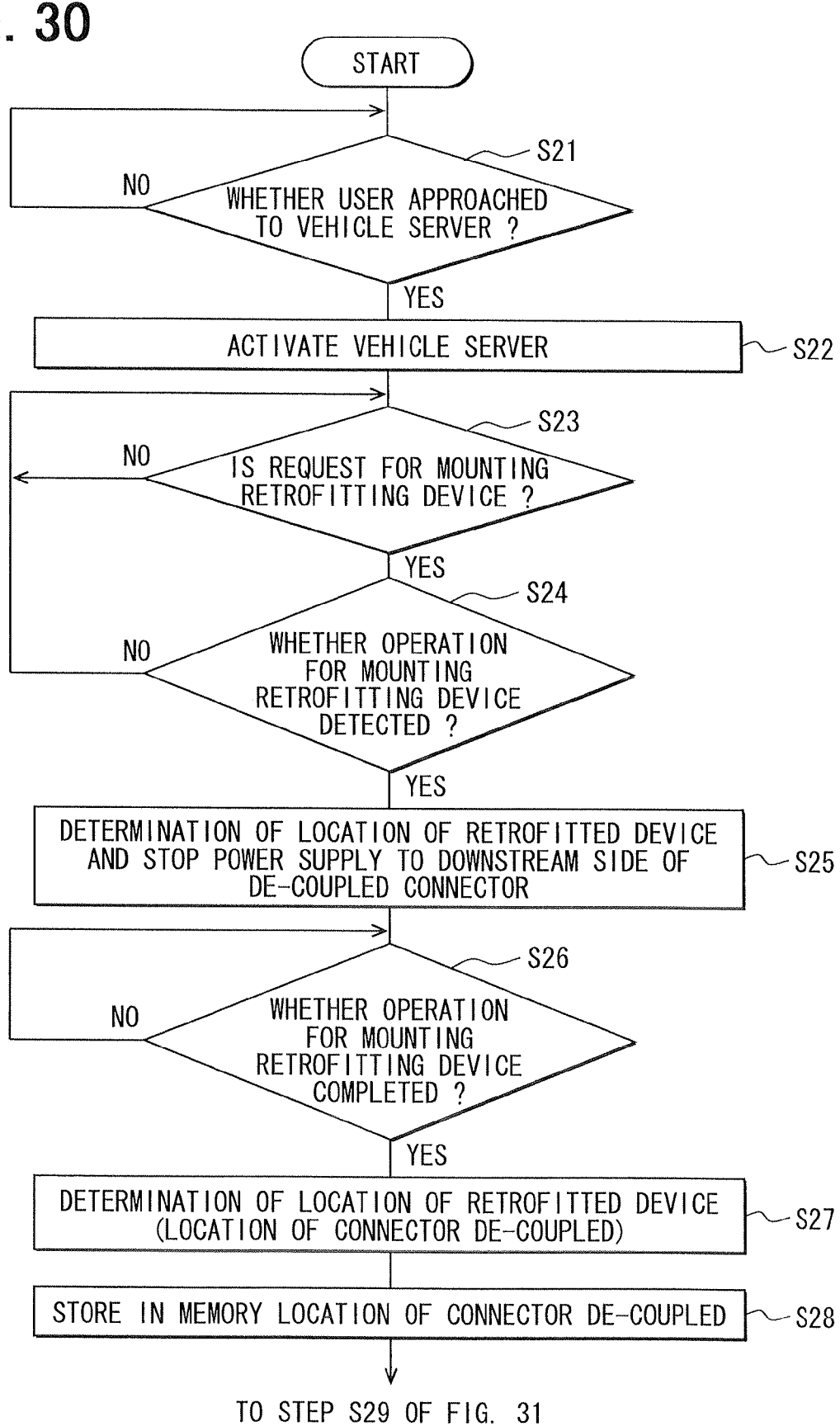
FIGS. 30 and 31 are flowcharts showing steps for carrying out the processes shown in FIG. 29.
Figure 31:
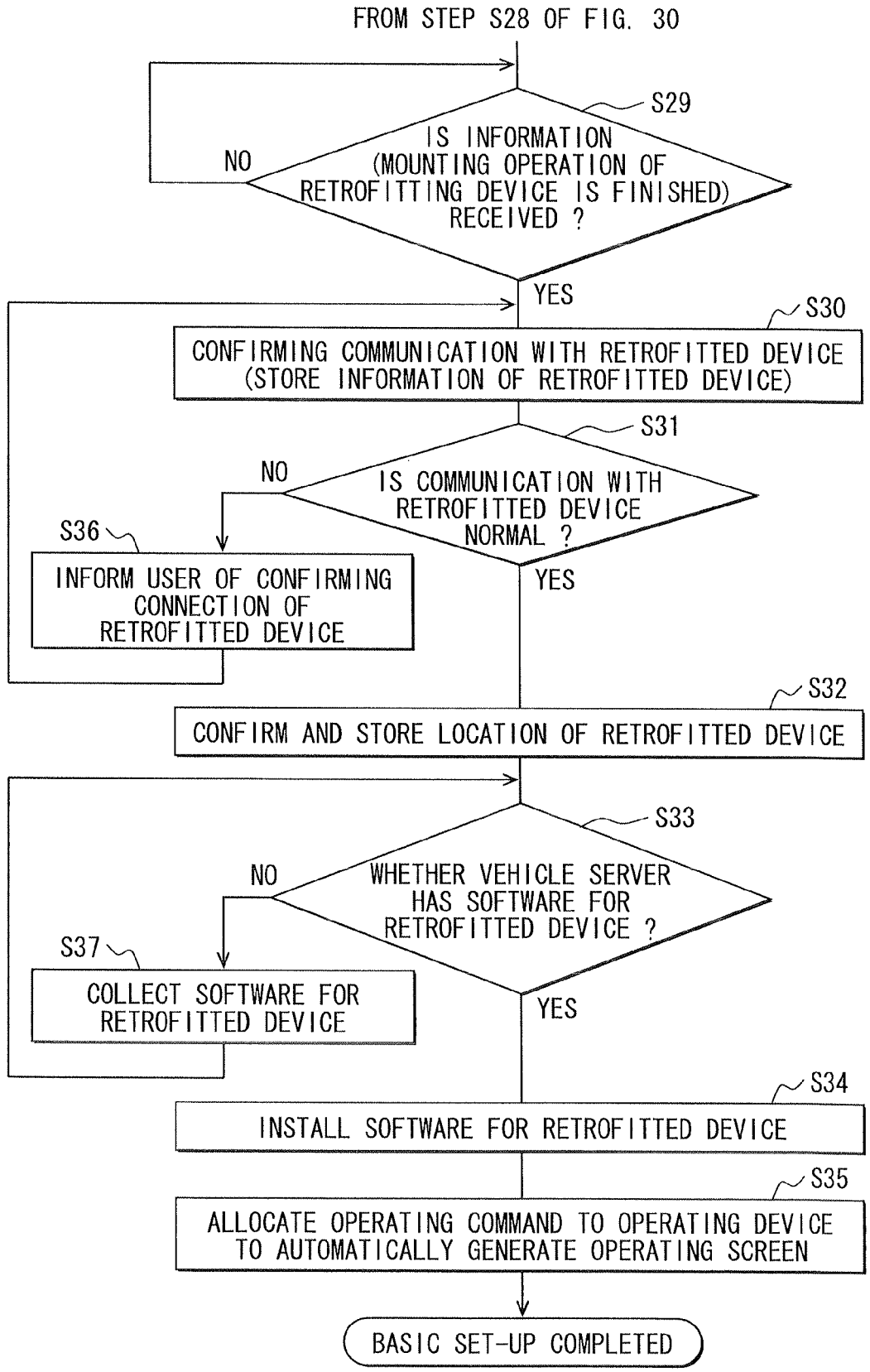

The above steps are indicated in a flowchart shown in FIGS. 30 and 31. When the process starts, the vehicle server determines at a step S21 whether the user has approached the vehicle server or not. This is detected by a sensor. When the sensor detects the approach of the user, the vehicle server is activated at a step S22.

At a step S23, the vehicle server confirms whether any request for mounting the retrofitting device is inputted by the user or not. In case of YES, the process goes to a step S24, at which the vehicle server confirms whether the operation for mounting the retrofitting device has been carried out or not.

When YES at the step S24, the process goes to a step S25, at which the vehicle server determines the location of the retrofitting device. This step is carried out by determining the wiring connector which is de-coupled for the purpose of mounting the device. More exactly, the vehicle server detects whether the electrical power supply to the downstream side is stopped or not.

At a step S26, the vehicle server confirms whether the operation for mounting the retrofitting device in the vehicle is completed or not. When YES, the process goes to a step S27, at which the vehicle server determines the location of the retrofitting device. Namely, the vehicle server determines the location of the wiring connector which is detached (de-coupled) to grasp the change of the wiring topology.

At a step S28, the vehicle server stores in the memory the location of the wiring connector which is detached (de-coupled). Then, at a step S29 of FIG. 31, the vehicle server determines whether it has received the information indicating that the mounting operation of the retrofitting device is completed. When YES, the process goes to a step S30, at which the vehicle server starts the communication with the retrofitting device and stores in the memory thereof the information relating to the retrofitting device.

At a step S31, the vehicle server confirms whether the communication between the vehicle server and the retrofitting device has been carried out in a good order. When YES, the process goes to a step S32, at which the vehicle server confirms specifications and the location of the retrofitting device and stores those information in its memory.

At a step S33, the vehicle server confirms whether the vehicle server stores in its memory the software for the retrofitting device or not. When YES, the process goes to a step S34, at which the vehicle server installs the necessary software in the memory of the vehicle server as well as in the memory of the retrofitting device.

At a step S35, the vehicle server sets up the operating screen of the operating device or the control device manipulated by the user, depending on the location of the retrofitting device. Namely, the vehicle server allocates the operating commands to the operating device and automatically generates the operating screen for the retrofitting device. And thereby, the basic set-up is completed.

At the step S31, when the vehicle server confirms that the communication between the vehicle server and the retrofitting device has not been carried out in the good order, the process goes to a step S36 at which the vehicle server informs the user to confirm the condition of the retrofitting device to the wiring connector. At the step S33, when the vehicle server determines that the vehicle server does not store in its memory the software for the retrofitting device, the process goes to a step S37, at which the vehicle server collects the software for the retrofitting device.

Figure 32:
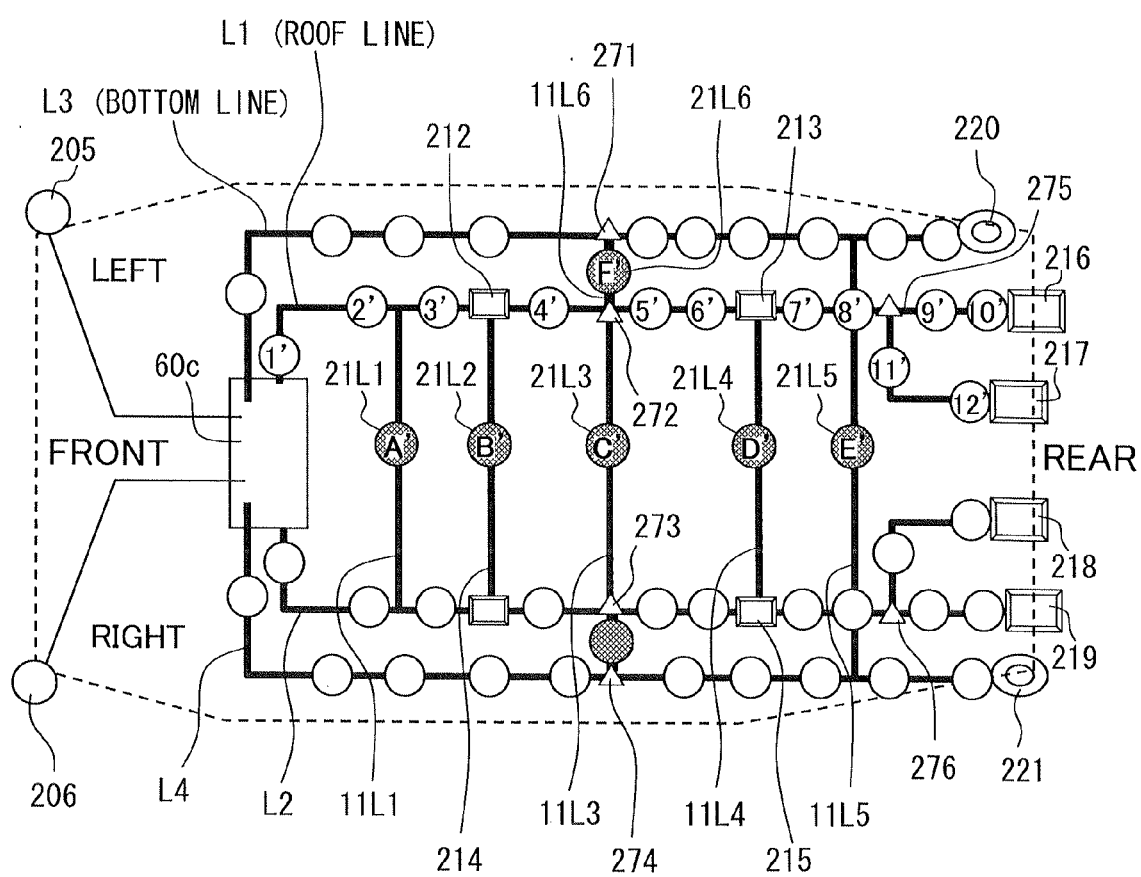
FIG. 32 is a schematic view showing the vehicle network according to the third embodiment, after the retrofitting device is connected to the vehicle network.

FIG. 32 is a schematic view showing the vehicle wiring network, wherein the retrofitting device (including the telecommunication device, the camera and so on) is connected to the vehicle wiring network shown in FIG. 27. The telecommunication devices 205 and 206 are provided at the front end of the vehicle, so that the telecommunication devices 205 and 206 perform communication with the roads and/or other vehicles. The cameras 212 to 215 are provided at the roof of the vehicle.

The rear monitoring cameras 216 to 219 are provided at the rear end of the roof of the vehicle. Furthermore, the rear and side monitoring cameras 220 and 221 (indicated by double circles) are provided at corners of the rear end of the vehicle roof, wherein the cameras 220 and 221 monitor motorcycles behind the vehicle. The monitoring devices 220 and 221 may be ultrasonic sensors, communication apparatus (wireless communication, optical communication such as LED), or auxiliary lighting apparatuses for illuminating the circumference of the vehicle. Alternatively, the monitoring devices 220 and 221 may be a radar device for detecting obstruction utilizing laser or millimeter wave.

The user may equip his vehicle with such a device using ultrasonic wave for detecting any obstruction in the backward of the vehicle and thereby assisting the user in parking the vehicle in a small parking space, or with such a device using laser to detect the obstruction. Furthermore, the user may mount a communication apparatus at the rear end of the vehicle, so that the user may communicate between his vehicle and another vehicle following his vehicle, wherein the following vehicle has a communication device with high directivity.

Although no shown in the drawings, operationality for the operating screen of the HMI device can be improved by limiting the operation for the HMI device so that unnecessary movement of the retrofitting device is not carried out. Such limitation is done when installing the software for the retrofitting device. In the known operating device (HMI device), which may give to the user reaction force of manipulation, the reaction force in a direction for which the operation is not allowed may be set at an excessively high value, so that the operation in the direction is practically not carried out.

The recessed portions are provided at portions of the vehicle body, into which the camera may be possibly mounted afterwards. A cap for the recessed portion as well as a cover for the vehicle body at the recessed portion may be provided in order to prevent increase moisture content in the recessed portion.

The communication lines of the wiring network are arranged (embedded) in the space of the reinforcing member, before the camera is mounted in the vehicle. In the case that another in-vehicle device is mounted in the vehicle, and the communication lines are connected to the other in-vehicle device, the wiring lines (including the communication lines as well as power-supply lines) are in the conductive condition. Therefore, when the retrofitting device will be mounted in the vehicle the power supply for the power-supply lines which are arranged at such portion for the retrofitting device is automatically cut off, so that any accident for electrical shock may not occur.

When the vehicle server detects that any one of the wiring connectors is de-coupled, the vehicle server automatically cuts off the power supply to the wiring connector. A sensor may be provided at a portion of the wiring connector, at which the wiring connector is unlocked so that connector parts are separated from each other, in order to detect whether the wiring connector is de-coupled or not. Alternatively, the electrical power supply to the wiring line may be cut off, when the cover for the recessed portion is detached for the purpose of mounting the retrofitting device and the location for the recessed portion is detected.

When the camera assembly is mounted in the recessed portion, the cover for the recessed portion is detached and the bushing member at the side portion of the pipe member is removed. Then the wiring connector is brought out from the pipe member, the wiring connector is de-coupled (the connector parts are separated), and the camera assembly is connected to the wiring connector.

According to the present embodiment, when the vehicle server detects that the switch of the retrofitting device (the camera assembly) is turned on, the vehicle server determines the location of the retrofitting device (the camera assembly) based on the IP address of the retrofitting device and the wiring topology. Then, the vehicle server installs the necessary device driver and functional software depending on the location and direction of the retrofitting device in the memory devices of the vehicle server and the retrofitting device. According to the above process, it is possible for the vehicle server to carry out proper operation of the retrofitting device depending on the location thereof.

When displaying the photographed images within an area of the screen of the display device, the vehicle driver may easily determine the position of the photographed images, if the displaying area on the screen for the photographed images is decided depending on the location of the camera assembly. For example, in the case that the camera assembly is provided on the left-hand side of the vehicle for monitoring the area of the left-hand side and rear side of the vehicle, the photographed images are displayed at a left-hand portion of the screen of the display device.

In addition, in the case that the camera assembly is provided on the left-hand side of the vehicle for monitoring the area of the left-hand side and rear side of the vehicle, the user may change the area to be monitored or may enlarge or reduce the area to be monitored. When the user operates the HMI device for changing (enlarging or reducing) the area to be monitored, the vehicle server outputs a command signal to the HMI device (controller) to memorize such operation of the user.

The user may customize the set-up for the displaying area on the screen or the operation of the HMI device after the camera assembly has been mounted in the vehicle. An order for priority may be established for set-up functions. When the user operates the retrofitting camera, the use may change visual field for the photographed images with operation at hand.

Other Embodiments

The present invention should not be limited to the above embodiments. The present invention may be further modified or changed in the following manners. For example, the above embodiments are explained with reference to the structure for mounting the camera assembly in the vehicle. However, a visual sensor for other purposes, a sensor for collecting external information, a microphone, an alarming device, a search light, a plug outlet, a battery charger, an external server or an antenna may be fixed to the vehicle body as the retrofitting device.

The vehicle body is explained as an example for the structure. The present invention may be further applied to other structures, such as a vehicle, a train, an airplane. The invention may be applied to an experimental laboratories or dwelling buildings as a special house. In those structures the reinforcing members are added to frame structures to increase mechanical strength.

A hard pipe member (such as a metal pipe made of aluminum, a pipe made of fiber reinforced plastic (FRP), having a rectangular cross-section or a C-shaped channel structure) may be used as the cylindrical reinforcing elements to the frame or reinforcing members of the frame structure. The bushing members are provided to the pipe member, wherein the bushing members may be removed from the pipe member when carrying out wiring operation.

A guide line (or wire) may be provided in the pipe member, so that more electrical power-supply line and/or more communication line may be installed afterwards. One end of the electrical power-supply line and/or communication line is bound on the guide line to pull the electrical power-supply line and/or communication line into the pipe member. The pipe members may only have the guide, lines before they are fixed to the frame structure, and the necessary electrical power-supply line and/or communication line may be afterwards pulled into the pipe members.

In the case that the vehicle body is composed of multiple vehicle body units, which are divided into several units, it is desirable to easily connect or remove the wires (power lines and communication lines) and/or guide lines for the respective vehicle body units. In the case that the guide lines are taken out from the pipe members after additional lines are provided or when the additional lines are not necessary, weight savings may become possible.

Optical cables may be provided in the pipe members instead of the electrical wires. In such a case, connectors for optical communication may be used instead of the wiring connectors.

In addition, electrical power supply lines for commercial power may be additionally provided in the pipe members, so that the commercial power is used for battery charging or electrical home appliance may be used in the vehicle or outside of the vehicle, when the vehicle is parked in a garage or in a public parking lot.

A part of the pipe members may be used as a duct for air-conditioning system, wherein low temperature or high temperature air (or high concentration of oxygen gas, refrigerating liquid (brine, or refrigerant) flows through the pipe members to perform temperature control the vehicle compartment. In this case, sensors may be provided in some portions of the pipe members so as to control the temperature and/or flow amount of the flowing fluid.

According to need, ID information may be given to the bushing members so that the vehicle server may detect whether any one of the bushing members is removed from the pipe member. Sensors may be provided in the pipe members in order to detect moisture, gas, smoke, temperature, so that the vehicle server may detect abnormal condition in the pipe members, such as abnormal high temperature, submersion under water, condensation and so on.

In the case that the shape and dimensions of the recessed portions, specifications for electrical power source for the power-supply lines and the communication lines, specifications for telecommunication and so on are published in advance via the internet, it is advantageous for the manufacturers of the retrofitting devices to develop their devices.

According to the present invention, the wiring connector is composed of a pair of connector parts which can be de-coupled from each other. Namely, the connector part is easily pushed into and/or pulled out from the other connector part. Connection by screws or a junction box for electrical connection by pressure terminals may not be suitable for the wiring connector of the present invention. A plug and plug-outlet are preferably used for the wiring connector of the invention.

The retrofitting device may include not only the in-vehicle component or device which is mounted in the vehicle by the user in the aftermarket but also such an in-vehicle component or device (a secondary in-vehicle component or device) which is mounted in the vehicle in a car-manufacturer's factory. Standard in-vehicle components and/or devices (primary in-vehicle components and/or devices) are mounted in the vehicle in the factory of the car manufacturer, when the vehicle is assembled. Namely, the primary in-vehicle components and/or devices are mounted (assembled) in the vehicle together with the vehicle wiring network and the vehicle server. And the vehicle server is checked whether it operates correctly. The secondary in-vehicle components and/or devices are mounted in the vehicle in the factory of the car manufacturer after the primary in-vehicle components and/or devices have been mounted or assembled to the vehicle. The secondary in-vehicle components and/or devices generally include such products which are selected and ordered by the user as optional devices. When the secondary in-vehicle components and/or devices are mounted in the vehicle, the set-up processes are automatically carried out for the vehicle server, the display device, and HMI device (controller). In addition, according to need, any necessary software (program) may be installed in the memory device of the vehicle server from the memory of the external server.

The retrofitting device may not be permanently mounted in the vehicle. The retrofitting device may be, for example, an external charging device, an external information providing device, an mutual information exchanging device with other vehicles, and so on. According to the present invention, it is possible to automatically display, warn, set-up program for such temporarily-mounted devices, and set-up the wiring network. It is further possible to respond to the retrofitting device manufactured by other manufacturers. Thus, it is possible to become diversified.

What is claimed is:

1. A wiring method for a structure, which is composed of multiple frame and/or reinforcing members and in which multiple wires are provided along with or embedded in the frame and/or reinforcing members, comprising steps of:
    preparing multiple wiring units, each having a hard pipe member, a wire provided in the pipe member, outside wiring connectors provided at outside of the pipe member and connected to each end of the wire, wherein the pipe member, the wire and the outside wiring connectors are unitized as the wiring unit;
    preparing multiple different groups of the wiring units, each group of the wiring units having the multiple wiring units, and length and/or diameter of the pipe member being different from group to group;
    arranging the different groups of the wiring units to the respective frame and/or reinforcing members and electrically connecting neighboring outside wiring connectors of the wiring units with each other to form a wiring network for the structure, an electronic control unit and an electrical device being connected to the wiring network; and
    fixing each of the wiring units to the respective frame and/or reinforcing members so as to increase mechanical strength of the structure.

2. The wiring method for the structure according to the claim 1, wherein
    each of the wiring units has bushing members attached to each end of the pipe member,
    the wire has a margin portion accommodated in the pipe member, and
    each end of the wire outwardly extends from the pipe member through each of the bushing members and connected to the respective outside wiring connectors of the other neighboring wiring units.

3. The wiring method for the structure according to the claim 1, wherein
    the wiring unit has an inside wiring connector provided in the pipe member and connected to the wire,
    each of the outside and inside wiring connectors has a pair of connector parts which are coupled to each other and can be de-coupled from each other according to need,
    an opening is formed at a side portion of the pipe member and a side bushing member is detachably provided at the opening,
    wherein the wiring method further comprises steps of:
    bringing out the inside wiring connector from the pipe member;
    de-coupling the inside wiring connector so that each of the connector parts are separated from each other; and
    electrically connecting each of the de-coupled connector parts to the electrical device.

4. The wiring method for the structure according to the claim 1, wherein
    the wiring unit is connected to multiple routers from which multiple communication lines are branched off, and/or to a wiring module connected to the electrical device,
    the communication line is supplied with electrical power from a power supply line formed by the wire provided in the wiring network, via the routers and/or the electrical module, and
    the electrical device is controlled by the electronic control unit by means of multiplex communication via the communication line.

5. The wiring method for the structure according to the claim 1, wherein
    the structure is a vehicle body, and
    the electrical device is a retrofitting in-vehicle device, which is mounted in the vehicle afterwards depending on a request of a vehicle user.

6. The wiring method for the structure according to the claim 4, wherein
    the electronic control unit automatically figures out a wiring topology indicating a connecting pattern of the wiring connectors and the electrical device, after the wiring network has been completed, wherein the wiring connectors and the electrical device are connected to the electronic control unit.

7. The wiring method for the structure according to the claim 6, wherein
    each of the wiring connectors has an ID information portion for storing therein ID information of the wiring connector and a communication control portion for controlling communication to a downstream side thereof, and
    the electronic control unit figures out the wiring topology by performing the following steps of:
    a first step of outputting a command signal to all of the wiring connectors to send back ID information thereof and reading the ID information sent back from the wiring connectors;
    a second step of selecting one of the wiring connectors which has sent back its ID information thereof to the electronic control unit;
    a third step of outputting a command signal to such selected wiring connector to stop communication to wiring connectors located at a downstream side of the selected wiring connector;
    a fourth step of outputting a command signal to all of the wiring connectors to send back ID information thereof under the condition that the selected wiring connector stops the communication to the downstream side wiring connectors, and reading the ID information sent back from the wiring connectors;

a fifth step of determining a number of reply for the ID information sent back from the wiring connectors;
a sixth step of repeating the above second to fifth steps; and
a seventh step of deciding the wiring topology of a tree structure based on number of reply for the respective wiring connectors determined by the above second to sixth-steps.

8. The wiring method for the structure according to the claim 7, wherein
the wiring network has link-up connectors provided in loop wires, and
the electronic control unit makes the link-up connectors in a non-conductive condition and performs the first to seventh steps.

9. The wiring method for the structure according to the claim 6, wherein
the electronic control unit starts an operation of a program, which is stored in the electronic control unit and specifically designed for the electrical device, based on the wiring topology figured out by the electronic control unit.

10. A wiring method for a structure, which is composed of multiple frame and/or reinforcing members and in which multiple wires are provided along with or embedded in the frame and/or reinforcing members, comprising steps of:
preparing multiple wiring units, each having a hard pipe member, a wire provided in the pipe member, outside wiring connectors provided at outside of the pipe member and connected to each end of the wire, wherein the pipe member, the wire and the outside wiring connectors are unitized as the wiring unit;
preparing multiple different groups of the wiring units, each group of the wiring units having the multiple wiring units, and length and/or diameter of the pipe member being different from group to group;
arranging the different groups of the wiring units to the respective frame and/or reinforcing members and electrically connecting neighboring outside wiring connectors of the wiring units with each other to form a wiring network for the structure, an electronic control unit and an electrical device being connected to the wiring network; and
fixing each of the wiring units to the respective frame and/or reinforcing members so as to increase mechanical strength of the structure,
wherein the wiring unit is connected to multiple routers from which multiple communication lines are branched off, and/or to a wiring module connected to the electrical device,
wherein the communication line is supplied with electrical power from a power supply line formed by the wire provided in the wiring network, via the routers and/or the electrical module,
wherein the electrical device is controlled by the electronic control unit by means of multiplex communication via the communication line,
wherein the electronic control unit automatically figures out a wiring topology indicating a connecting pattern of the wiring connectors and the electrical device, after the wiring network has been completed, wherein the wiring connectors and the electrical device are connected to the electronic control unit,
wherein each of the wiring connectors has an ID information portion for storing therein ID information of the wiring connector and a communication control portion for controlling communication to a downstream side thereof, and
wherein the electronic control unit figures out the wiring topology by performing the following steps of:
a first step of outputting a command signal to all of the wiring connectors to send back ID information thereof and reading the ID information sent back from the wiring connectors;
a second step of selecting one of the wiring connectors which has sent back its ID information thereof to the electronic control unit;
a third step of outputting a command signal to such selected wiring connector to stop communication to wiring connectors located at a downstream side of the selected wiring connector;
a fourth step of outputting a command signal to all of the wiring connectors to send back ID information thereof under the condition that the selected wiring connector stops the communication to the downstream side wiring connectors, and reading the ID information sent back from the wiring connectors;
a fifth step of determining a number of reply for the ID information sent back from the wiring connectors;
a sixth step of repeating the above second to fifth steps; and
a seventh step of deciding the wiring topology of a tree structure based on number of reply for the respective wiring connectors determined by the above second to sixth steps.

11. The wiring method for the structure according to the claim 10, wherein
the wiring network has link-up connectors provided in loop wires, and
the electronic control unit makes the link-up connectors in a non-conductive condition and performs the first to seventh steps.

12. The wiring method for the structure according to the claim 10, wherein
the electronic control unit starts an operation of a program, which is stored in the electronic control unit and specifically designed for the electrical device, based on the wiring topology figured out by the electronic control unit.

13. A wiring method for a structure, which is composed of multiple frame and/or reinforcing members and in which multiple wires are provided along with or embedded in the frame and/or reinforcing members, comprising steps of:
preparing multiple wiring units, each having a hard pipe member, a wire provided in the pipe member, outside wiring connectors provided at outside of the pipe member and connected to end of the wire, wherein the pipe member, the wire and the outside wiring connectors are unitized as the wiring unit;
preparing multiple different groups of the wiring units, each group of the wiring units having the multiple wiring units, and length and/or diameter of the pipe member being different from group to group;
arranging the different groups of the wiring units to the respective frame and/or reinforcing members and electrically connecting neighboring outside wiring connectors of the wiring units with each other to form a wiring network for the structure, an electronic control unit and an electrical device being connected to the wiring network; and
fixing each of the wiring units to the respective frame and/or reinforcing members so as to increase mechanical strength of the structure,
wherein the structure is a vehicle body, wherein the electrical device is a retrofitting in-vehicle device, which is mounted in the vehicle afterwards depending on a request of a vehicle user, wherein the electronic control unit automatically figures out a wiring topology indicating a connecting pattern of the wiring connectors and the electrical device, after the wiring network has been completed, wherein the wiring connectors and the electrical device are connected to the electronic control unit, wherein each of the wiring connectors has an ID information portion for storing therein ID information of the wiring connector and a communication control portion for controlling communication to a downstream side thereof, and wherein the electronic control unit figures out the wiring topology by performing the following steps of:

a first step of outputting a command signal to all of the wiring connectors to send back ID information thereof and reading the ID information sent back from the wiring connectors;

a second step of selecting one of the wiring connectors which has sent back its ID information thereof to the electronic control unit;

a third step of outputting a command signal to such selected wiring connector to stop communication to wiring connectors located at a downstream side of the selected wiring connector;

a fourth step of outputting a command signal to all of the wiring connectors to send back ID information thereof under the condition that the selected wiring connector stops the communication to the downstream side wiring connectors, and reading the ID information sent back from the wiring connectors;

a fifth step of determining a number of reply for the ID information sent back from the wiring connectors;

a sixth step of repeating the above second to fifth steps; and a seventh step of deciding the wiring topology of a tree structure based on number of reply for the respective wiring connectors determined by the above second to sixth steps.

* * * * *